(12) United States Patent
Chou et al.

(10) Patent No.: US 9,398,302 B2
(45) Date of Patent: Jul. 19, 2016

(54) IMAGE ENCODING METHOD AND APPARATUS WITH RATE CONTROL BY SELECTING TARGET BIT BUDGET FROM PRE-DEFINED CANDIDATE BIT BUDGETS AND RELATED IMAGE DECODING METHOD AND APPARATUS

(71) Applicant: MEDIATEK INC., Hsin-Chu (TW)

(72) Inventors: Han-Liang Chou, Hsinchu County (TW); Tsu-Ming Liu, Hsinchu (TW); Tung-Hsing Wu, Chiayi (TW); Kun-Bin Lee, Taipei (TW); Chi-Cheng Ju, Hsinchu (TW)

(73) Assignee: MEDIATEK INC., Science-Based Industrial Park, Hsin-Chu (TW)

(*) Notice: Subject to any disclaimer, the term of this patent is extended or adjusted under 35 U.S.C. 154(b) by 162 days.

(21) Appl. No.: 14/198,557

(22) Filed: Mar. 5, 2014

(65) Prior Publication Data

US 2014/0254949 A1    Sep. 11, 2014

Related U.S. Application Data

(60) Provisional application No. 61/774,786, filed on Mar. 8, 2013.

(51) Int. Cl.
*G06K 9/36* (2006.01)
*G06K 9/46* (2006.01)
*H04N 19/146* (2014.01)
*H04N 19/176* (2014.01)
*H04N 19/124* (2014.01)

(52) U.S. Cl.
CPC ........... *H04N 19/146* (2014.11); *H04N 19/124* (2014.11); *H04N 19/176* (2014.11)

(58) Field of Classification Search
CPC .. H04N 19/124; H04N 19/146; H04N 19/176
See application file for complete search history.

(56) References Cited

U.S. PATENT DOCUMENTS

| 2002/0122482 | A1  | 9/2002 | Kim |
| 2006/0034522 | A1  | 2/2006 | Mohsenian |
| 2007/0223576 | A1* | 9/2007 | Tan ...................... H04N 19/176 375/240.03 |
| 2008/0181308 | A1* | 7/2008 | Wang .................. H04N 19/105 375/240.16 |
| 2011/0051806 | A1* | 3/2011 | Lee ...................... H04N 19/159 375/240.03 |

FOREIGN PATENT DOCUMENTS

WO    2007104522 A1    9/2007

OTHER PUBLICATIONS

"International Search Report" mailed on Jun. 13, 2014 for International application No. PCT/CN2014/073062, International filing date:Mar. 7, 2014.

* cited by examiner

*Primary Examiner* — Phuoc Tran
(74) *Attorney, Agent, or Firm* — Winston Hsu; Scott Margo

(57) ABSTRACT

An image encoding method with rate control includes at least the following steps: defining a plurality of candidate bit budgets corresponding to different pre-defined maximum encoded bit lengths for one coding unit respectively; when encoding pixel data of a plurality of pixels within a current coding unit of an access unit of a frame, determining a target bit budget selected from the candidate bit budgets and allocating the target bit budget to the current coding unit; and outputting encoded pixel data of the pixels within the current coding unit that is generated from the encoder, wherein a bit length of the encoded pixel data is smaller than or equal to the target bit budget.

35 Claims, 11 Drawing Sheets

IMAGE ENCODING METHOD AND APPARATUS WITH RATE CONTROL BY SELECTING TARGET BIT BUDGET FROM PRE-DEFINED CANDIDATE BIT BUDGETS AND RELATED IMAGE DECODING METHOD AND APPARATUS

CROSS REFERENCE TO RELATED APPLICATIONS

This application claims the benefit of U.S. provisional application No. 61/774,786, filed on Mar. 8, 2013 and incorporated herein by reference.

BACKGROUND

The disclosed embodiments of the present invention relate to encoding and decoding (or compressing and decompressing) an image, and more particularly, to an image encoding method and apparatus with rate control by selecting a target bit budget from a plurality of pre-defined candidate bit budgets and related image decoding method and apparatus.

A display interface may be disposed between a first chip and a second chip to transmit display data from the first chip to the second chip for further processing. For example, the first chip may be a host application processor, and the second chip may be a driver integrated circuit (IC). The display data may include image data, video data, graphic data, and/or OSD (on-screen display) data. Besides, the display data may be single view data for two-dimensional (2D) playback or multiple view data for three-dimensional (3D) playback. When a display panel supports a higher display resolution, 2D/3D playback with higher resolution can be realized. Hence, the display data transmitted over the display interface would have a larger data size/data rate, which increases the power consumption of the display interface inevitably. If the host application processor and the driver IC are both located at a portable device (e.g., a smartphone) powered by a battery device, the battery life is shortened due to the increased power consumption of the display interface.

Similarly, a camera interface may be disposed between a camera module and a post-processing chip to transmit camera data from the camera module to the post-processing chip for further processing. For example, the post-processing chip may be a host application processor. When the camera module supports a higher image resolution, the camera data transmitted over the camera interface would have a larger data size/data rate, which increases the power consumption of the camera interface inevitably. If the camera module and the host application processor are both located at a portable device (e.g., a smartphone) powered by a battery device, the battery life is shortened due to the increased power consumption of the camera interface.

Thus, there is a need for an innovative design which can effectively reduce the power consumption of the display/camera interface.

SUMMARY

In accordance with exemplary embodiments of the present invention, an image encoding method and apparatus with rate control by selecting a target bit budget from a plurality of pre-defined candidate bit budgets and related image decoding method and apparatus are proposed.

According to a first aspect of the present invention, an exemplary image encoding method with rate control is disclosed. The exemplary image encoding method includes: defining a plurality of candidate bit budgets corresponding to different pre-defined maximum encoded bit lengths for one coding unit respectively; when encoding pixel data of a plurality of pixels within a current coding unit of an access unit of a frame, determining a target bit budget selected from the candidate bit budgets and allocating the target bit budget to the current coding unit; and outputting encoded pixel data of the pixels within the current coding unit, wherein a bit length of the encoded pixel data is smaller than or equal to the target bit budget.

According to a second aspect of the present invention, an exemplary image decoding method is disclosed. The exemplary image decoding method includes: defining a plurality of candidate bit budgets corresponding to different pre-defined maximum encoded bit lengths for one coding unit respectively; receiving and decoding a bit-stream composed of encoded pixel data of an access unit in a frame, wherein the access unit includes a plurality of coding units; and obtaining bit budget information of a current coding unit based on information derived from decoding the bit-stream for determining a target bit budget allocated to the current coding unit from the candidate bit budgets.

According to a third aspect of the present invention, an exemplary image encoding apparatus is disclosed. The exemplary image encoding apparatus includes an encoder and a rate controller. The encoder is arranged for encoding pixel data of a plurality of pixels within a current coding unit of an access unit of a frame, and outputting encoded pixel data of the pixels within the current coding unit. The rate controller is arranged for defining a plurality of candidate bit budgets corresponding to different pre-defined maximum encoded bit lengths for one coding unit respectively; and determining a target bit budget selected from the candidate bit budgets and allocating the target bit budget to the current coding unit when the encoder is encoding the current coding unit, wherein a bit length of the encoded pixel data output from the encoder is smaller than or equal to the target bit budget.

According to a fourth aspect of the present invention, an exemplary image decoding apparatus is disclosed. The exemplary image decoding apparatus includes a decoder and a bit budget identification circuit. The decoder is arranged for receiving and decoding a bit-stream composed of encoded pixel data of an access unit in a frame, wherein the access unit includes a plurality of coding units. The bit budget identification circuit is arranged for defining a plurality of candidate bit budgets corresponding to different pre-defined maximum encoded bit lengths for one coding unit respectively; and obtaining bit budget information of a current coding unit based on information derived from decoding the bit-stream for determining a target bit budget allocated to the current coding unit from the candidate bit budgets.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
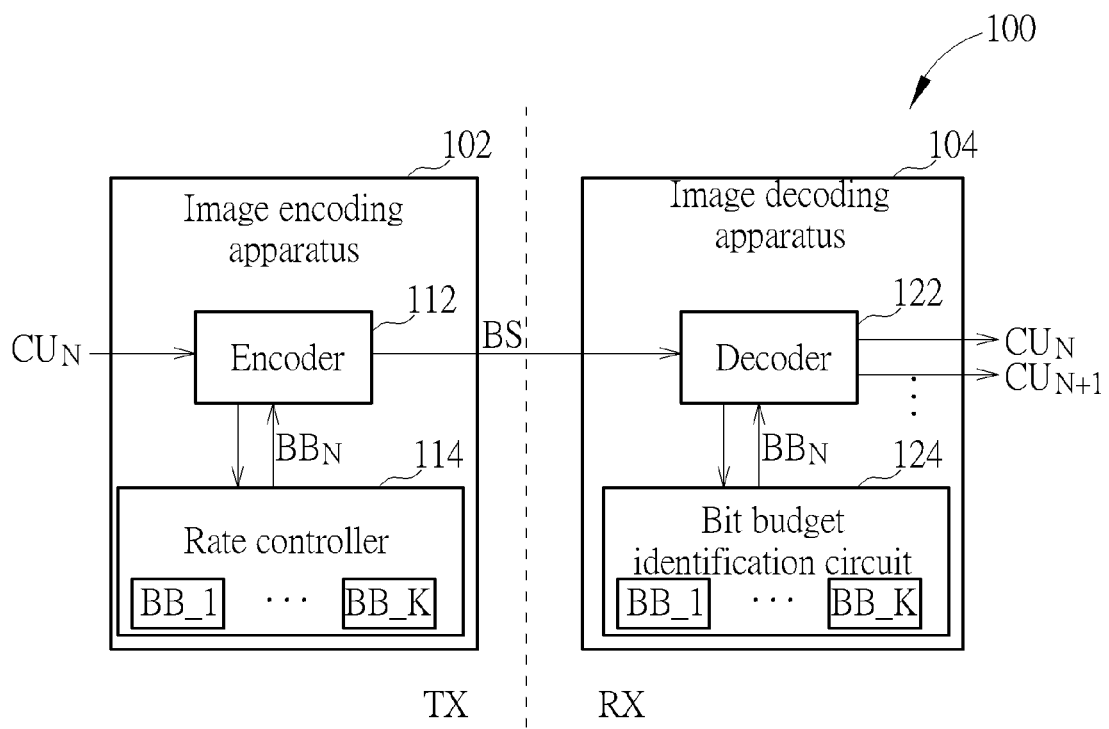
FIG. 1 is a diagram illustrating a data processing system according to an embodiment of the present invention.

FIG. 1 is a diagram illustrating a data processing system according to an embodiment of the present invention. The data processing system 100 includes an image encoding apparatus 102 and an image decoding apparatus 104, where the image encoding apparatus 102 is located at a transmitting end TX, and the image decoding apparatus 104 is located at a receiving end RX. Several exemplary applications using the proposed data processing system 100 are illustrated in FIGS. 2-4 for illustrative purposes.

Figure 2:
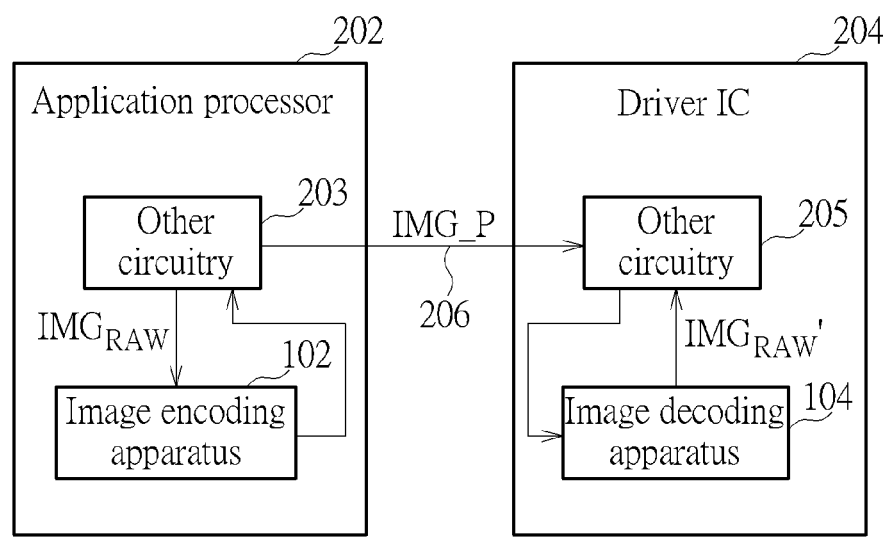
FIG. 2 is a diagram illustrating a first application which using the proposed data processing system.

FIG. 2 is a diagram illustrating a first application which using the proposed data processing system. An application processor 202 includes the image encoding apparatus 102 and other circuitry 203. A driver integrated circuit (IC) 204 has the image decoding apparatus 104 and other circuitry 205. The other circuitry 203 in the application processor 202 generates a raw image $IMG_{RAW}$ to the image encoding apparatus 102. The other circuitry 203 may apply pixel processing to the raw image $IMG_{RAW}$ before outputting the raw image $IMG_{RAW}$. The image encoding apparatus 102 is coupled to the other circuitry 203, and performs lossy/lossless image compression/encoding upon the raw image $IMG_{RAW}$ to generate an encoded image IMG_P, wherein the encoded image IMG_P may be transmitted to a display interface 206 through the other circuitry 203. In a preferred embodiment of the present invention, the encoded image IMG_P is generated under a proposed rate control mechanism which dynamically adjusts encoder parameter(s) to achieve a desired bitrate. Specifically, one target bit budget for each coding unit is selected from a plurality of different candidate bit budgets each having a pre-defined maximum encoded bit length. The application processor 202 transmits the encoded image IMG_P to the driver IC 204 via the display interface 206. For example, the display interface 206 may be a display serial interface (DSI) standardized by a Mobile Industry Processor Interface (MIPI) or an embedded display port (eDP) standardized by a Video Electronics Standards Association (VESA).

The driver IC 204 receives the encoded image IMG_P from the display interface 206, and then transmits the encoded image IMG_P to the image decoding apparatus 104 through other circuitry 205. The image decoding apparatus 104 performs lossy/lossless decompression/decoding upon the encoded image IMG_P to recover a raw image $IMG_{RAW}'$, and transmits the raw image $IMG_{RAW}'$ to the other circuitry 205 for further processing. The raw image $IMG_{RAW}'$ at the decoder side may be identical to or different from the raw image $IMG_{RAW}$ at the encoder side, depending upon the compression/encoding algorithm applied to coding units within the raw image $IMG_{RAW}$. Compared to transmitting the raw image $IMG_{RAW}$ over the display interface 206 directly, transmitting the encoded image IMG_P over the display interface 206 has smaller data size/lower data rate. Hence, the power consumption of the display interface 206 is reduced correspondingly.

Figure 3:
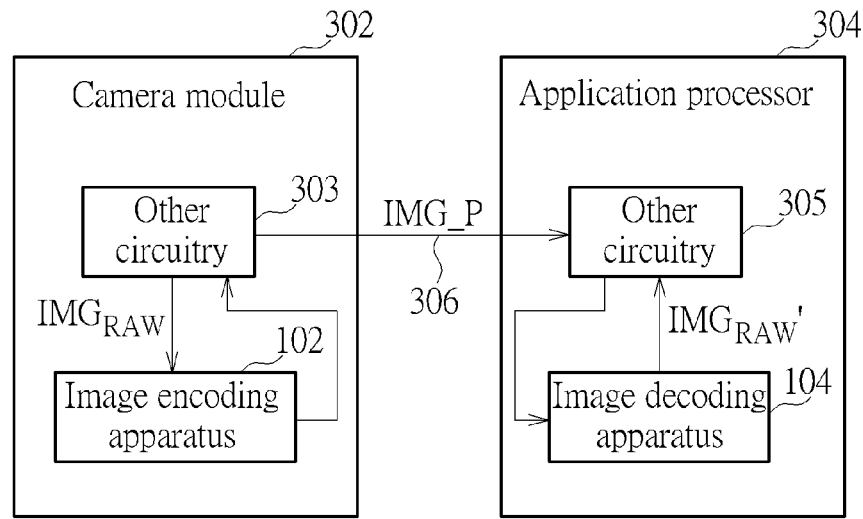
FIG. 3 is a diagram illustrating a second application which using the proposed data processing system.
Figure 4:
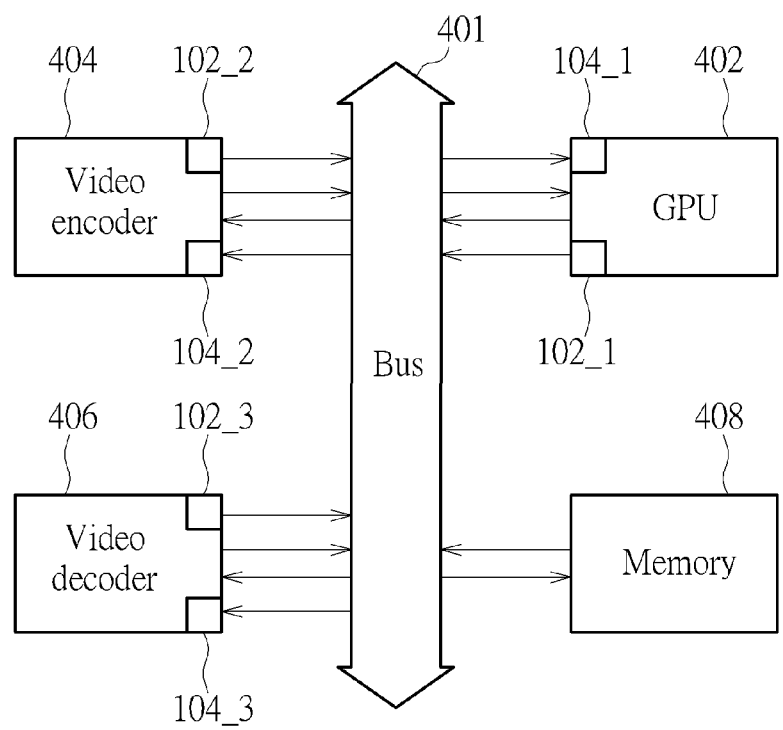
FIG. 4 is a diagram illustrating a third application which using the proposed data processing system.

FIG. 3 is a diagram illustrating a second application which using the proposed data processing system. A camera module 302 includes the image encoding apparatus 102 and other circuitry 303. An application processor 304 has the image decoding apparatus 104 and other circuitry 305. The other circuitry 303 of the camera module 302 is coupled to the image encoding apparatus 102, and generates a raw image $IMG_{RAW}$ to the image encoding apparatus 102. The other circuitry 303 may apply pixel processing to the raw image $IMG_{RAW}$ before outputting the raw image $IMG_{RAW}$. The image encoding apparatus 102 performs lossy/lossless image compression/encoding upon the raw image $IMG_{RAW}$ to generate an encoded image IMG_P, where the encoded image IMG_P is transmitted to a camera interface 306 through the other circuitry 303. In a preferred embodiment of the present invention, the encoded image IMG_P is generated under a proposed rate control mechanism which dynamically adjusts encoder parameter(s) to achieve a desired bitrate. Specifically, a target bit budget for each coding unit is selected from a plurality of different candidate bit budgets each having a pre-defined maximum encoded bit length. The camera module 302 transmits the encoded image IMG_P to the application processor 304 via the camera interface 306. For example, the camera interface 306 may be a camera serial interface (CSI) standardized by a Mobile Industry Processor Interface (MIPI).

The application processor 304 receives the encoded image IMG_P from the camera interface 306, and then transmits the encoded image IMG_P to the image decoding apparatus 104 through other circuitry 305. The image decoding apparatus 104 performs lossy/lossless decompression/decoding upon the encoded image IMG_P to recover a raw image $IMG_{RAW}'$, and transmits the raw image $IMG_{RAW}'$ to the other circuitry 305 for further processing. The raw image $IMG_{RAW}'$ at the decoder side may be identical to or different from the raw image $IMG_{RAW}$ at the encoder side, depending upon the compression/encoding algorithm applied to coding units within the raw image $IMG_{RAW}$. Similarly, compared to transmitting the raw image $IMG_{RAW}$ over the camera interface 306 directly, transmitting the encoded image IMG_P over the camera interface 306 has smaller data size/lower data rate. Hence, the power consumption of the camera interface 306 is reduced correspondingly.

FIG. 4 is a diagram illustrating a third application which using the proposed data processing system. In this embodiment, the proposed data processing system is employed by a graphics platform having, for example, a graphics processing unit (GPU) 402, a video encoder 404, a video decoder 406 and a memory 408. The GPU 402, video encoder 404, video decoder 406 and memory 408 communicate with one another through a bus 401. Each of the GPU 402, video encoder 404 and video decoder 406 is equipped with an image encoding apparatus 102_1/102_2/102_3 and an image decoding apparatus 104_1/104_2/104_3. As encoded images are transmitted through the bus 401, the bandwidth of the bus 401 can be reduced. In a preferred embodiment of the present invention, the encoded image is generated under a proposed rate control mechanism which dynamically adjusts encoder parameter(s) to achieve a desired bitrate. Specifically, a target bit budget for each coding unit is selected from a plurality of different candidate bit budgets each having a pre-defined maximum encoded bit length.

Figure 5:
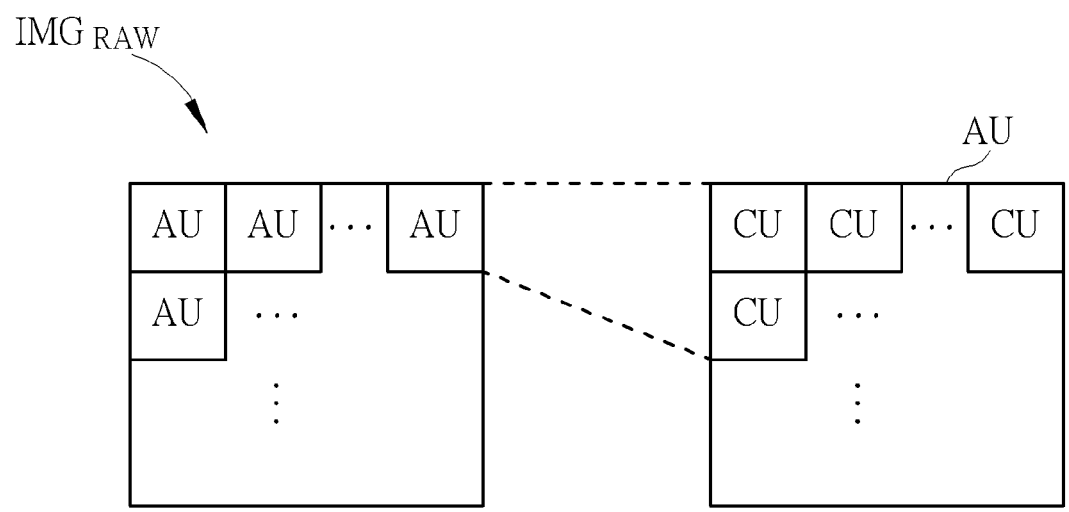
FIG. 5 is a diagram illustrating the relationship between access units and coding units within one frame.

As mentioned above, the image encoding apparatus may employ the proposed rate control mechanism to allocate a budget of bits to each coding unit such that the size of encoded data of each coding unit is ensured to be equal to or smaller than a designated bit budget allocated to the coding unit. Please refer to FIG. 5, which is a diagram illustrating the relationship between access units and coding units within one frame. As can be seen from FIG. 5, one frame (e.g., raw image $IMG_{RAW}$) may be partitioned into at least one access unit (AU), each AU contains a plurality of coding units, and each coding unit (CU) contains a group of pixels. That is, the frame data is split into pixel data of a plurality of coding units. The coding unit may be one-dimensional, such as 4×1, 8×1, 16×1, 32×1, 64×1, etc., or may be two-dimensional, such as 4×2, 4×4, 8×2, 8×4, 8×8, 16×2, etc. One coding unit is a basic unit of pixel data encoding with rate control. The bit budget of each access unit is a predetermined value, and the sum of bit budgets allocated to all coding units within the same access unit is required to be smaller than or equal to the predetermined bit budget of the access unit, where the bit budget of one coding unit means the maximum encoded bit length of the coding unit.

If the encoded pixel data of coding units have variable lengths and are concatenated in sequence after precise rate control, such a bit-stream is hard to achieve high throughput decoding since the bit start position of the next coding unit N+1 is known only after the current coding unit N has been decoded. In other words, there is a dependency between two consecutive coding units to be decoded, and only a sequential decoding operation is feasible on the decoder side. To achieve high throughput decoding, the present invention proposes a rate control mechanism which does not employ precise rate control to determine a bit budget for a coding unit by an actual encoded bit length of the coding unit. Instead, the proposed rate control mechanism allows a bit budget allocated to a coding unit to be different from the actual encoded bit length of the coding unit. Specifically, the proposed rate control mechanism has many pre-defined candidate bit budgets, where a target bit budget for each coding unit is selected from the candidate bit budgets. Similarly, the proposed rate control mechanism may be implemented in the image encoding apparatus 102 to dynamically adjust the encoder parameter(s) (e.g., a quantization step) to ensure that an encoded bit length of any coding unit is smaller than or equal to a target bit budget selected from the pre-defined candidate bit budgets. Besides, the bit budget information of a coding unit (e.g., a bit budget index of the candidate bit budget selected as the target bit budget allocated to the coding unit) may be embedded in a header of the encoded coding unit in a bit-stream BS generated from the image encoding apparatus 102, thus allowing the image decoding apparatus 104 to perform parallel decoding upon multiple coding units.

Figure 6:
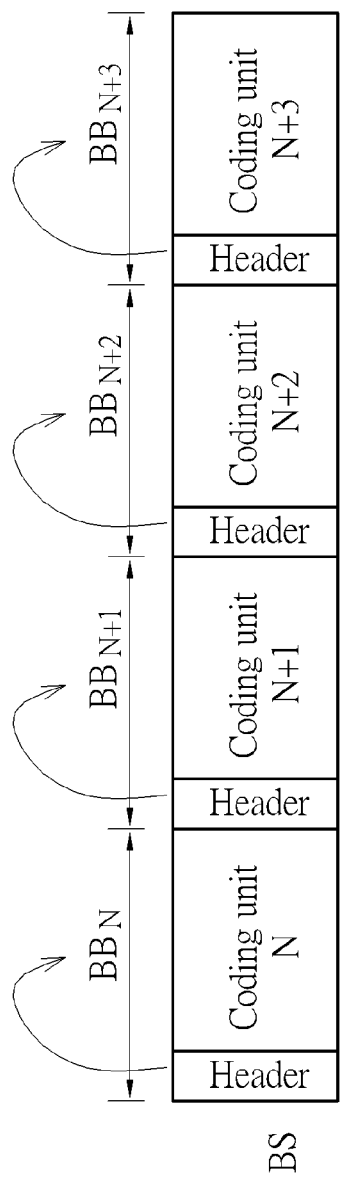
FIG. 6 is a diagram illustrating an example of embedding bit budget information in a bit-stream generated from the image encoding apparatus shown in FIG. 1.

Please refer to FIG. 6, which is a diagram illustrating an example of embedding bit budget information in a bit-stream generated from the image encoding apparatus 102. In this example, the bit budget information (e.g., a bit budget index) of a target bit budget allocated to each coding unit is recorded in the corresponding header in the bit-stream BS. Hence, when a decoding operation of the bit-stream BS is started, the target bit budget $BB_N$ allocated to the coding unit N (e.g., a current coding unit) can be known by parsing the header of the coding unit N. In this way, the bit start position of the next coding unit N+1 can be known based on the target bit budget $BB_N$ allocated to the coding unit N. Similarly, the bit start position of the coding unit N+2 can be known based on the target bit budget $BB_{N+1}$ allocated to the coding unit N+1 derived from parsing the header of the coding unit N+1; and the bit start position of the coding unit N+3 can be known based on the bit budget $BB_{N+2}$ allocated to the coding unit N+2 derived from parsing the header of the coding unit N+2. In this way, with the help of the bit budget information embedded in the headers, the bit start position of each coding unit in the bit-stream BS can be known by the image decoding apparatus 104. Hence, the image decoding apparatus 104 may perform parallel decoding upon multiple coding units to satisfy any decoding throughput requirement. For one example, the image decoding apparatus 104 may decode two coding units in parallel to satisfy a first decoding throughput requirement. For another example, the image decoding apparatus 104 may decode three coding units in parallel to satisfy a second decoding throughput requirement.

Figure 7:
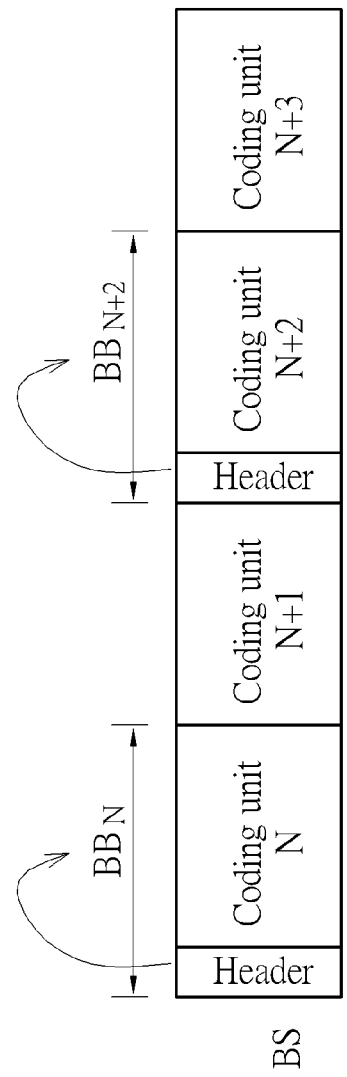
FIG. 7 is a diagram illustrating another example of embedding bit budget information in a bit-stream generated from the image encoding apparatus shown in FIG. 1.

However, under a fixed decoding throughput requirement, it may not be necessary to embed the bit budget information of each coding unit in the header of each coding unit. In this way, the size of the bit-stream BS can be reduced for achieving better coding efficiency. Please refer to FIG. 7, which is a diagram illustrating another example of embedding bit budget information in a bit-stream generated from the image encoding apparatus 102. In this embodiment, the image decoding apparatus 104 is designed to decode two coding units in parallel for meeting a designated decoding throughput requirement of a particular application. Hence, only one of two successive coding units has its bit budget information embedded in the corresponding header. In this example, the bit start position of the coding unit N+1 can be known based on the target bit budget $BB_N$ allocated to the coding unit N (e.g., a current coding unit) derived from parsing the header of the coding unit N. The bit start position of the coding unit N+2 can be known after parallel decoding of the coding units N and N+1 is done. In other words, the bit start position of the coding unit N+2 is known without needing the bit budget information of the coding unit N+1 to be embedded in the header of the coding unit N+1.

Further details directed to generating encoded pixel data of pixels within one coding unit based on the proposed rate control mechanism are described as follows. Please refer to FIG. 1 again. The image encoding apparatus 102 includes an encoder 112 and a rate controller 114. The encoder 102 is arranged for encoding pixel data of coding units within an access unit of a frame (i.e., a raw image $IMAGE_{RAW}$) to generate a bit-stream BS composed of encoded pixel data of the frame (i.e., an encoded image IMG_P). Hence, concerning a current coding unit $CU_N$ of the access unit to be encoded, the encoder 102 encodes pixel data of a plurality of pixels within the current coding unit $CU_N$, and outputs encoded pixel data of the pixels within the current coding unit $CU_N$. The rate controller 114 is coupled to the encoder 112, and arranged for defining a plurality of candidate bit budgets BB_1-BB_K corresponding to different pre-defined maximum encoded bit lengths for one coding unit respectively. Besides, the rate controller 114 is further arranged for determining a target bit budget $BB_N$ selected from the candidate bit budgets BB_1-BB_K and allocating the target bit budget $BB_N$ to the current coding unit $CU_N$ when the encoder 112 is encoding the current coding unit $CU_N$, wherein a bit length of the encoded pixel data output from the encoder 112 is smaller than or equal to the target bit budget $BB_N$.

The number of pre-defined candidate bit budgets may be adjusted, depending upon actual design consideration. In one exemplary design, the number of pre-defined candidate bit budgets is three (i.e., K=3), where candidate bit budgets BB_1-BB_3 are set by BIT_THR(0), BIT_THR(1) and BIT_THR(2), respectively. The candidate bit budget BIT_THR(1) is set by an expected average bit budget for coding units within the same access unit. As mentioned above, the bit budget of one access unit is a predetermined value. Suppose that the number of coding units within an access unit is M and the access unit has a predetermined bit budget $BB_{AU}$. The expected average bit budget for coding units within the access unit is equal to $$\frac{BB_{AU}}{M}.$$

Thus, the candidate bit budget BIT_THR(1) is set by $$\frac{BB_{AU}}{M}$$

$\left(\text{i.e., BIT\_THR}(1) = \frac{BB_{AU}}{M}\right)$.

Besides, to make the bit budget threshold design simpler, BIT_THR(0)=BIT_THR(1)−BIT_offset, and BIT_THR(2)=BIT_THR(1)+BIT_offset, where BIT_offset≥1.

In another exemplary design, the number of pre-defined candidate bit budgets may be larger than three. For example, K=5. Hence, candidate bit budgets BB_1-BB_5 are set by BIT_THR(0), BIT_THR(1), BIT_THR(2), BIT_THR(3) and BIT_THR(4), respectively. The candidate bit budget BIT_THR(2) is equal to an expected average bit budget for coding units within the same access unit. That is, the candidate bit budget BIT_THR(2) is set by $$\frac{BB_{AU}}{M}$$

$\left(\text{i.e., BIT\_THR}(2) = \frac{BB_{AU}}{M}\right)$.

Besides, to make the bit budget threshold design simpler, BIT_THR(1)=BIT_THR(2)−BIT_offset1, and BIT_THR(3)= BIT_THR(2)+BIT_offset1, BIT_THR(0)=BIT_THR(2)−BIT_offset2, and BIT_THR(4)=BIT_THR(2)+BIT_offset2, where 1≤BIT_offset1≤BIT_offset2.

For clarity and simplicity, the following assumes that the rate controller 114 employs three candidate bit budgets BB_1-BB_3 set by BIT_THR(0)–BIT_THR(2), respectively. However, a person skilled in the art should appreciate that the proposed rate control mechanism has no limitation on the number of pre-defined candidate bit budgets.

Figure 8:
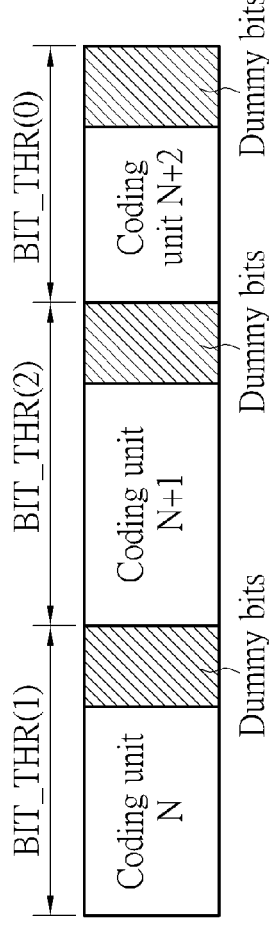
FIG. 8 is a diagram illustrating an exemplary encoding result generated based on target bit budgets selected from candidate bit budgets.

It should be noted that the target bit budget $BB_N$ allocated to the current coding unit $CU_N$ is selected from candidate bit budgets each having a pre-defined value, rather than precisely set by an actual encoded bit size of the current coding unit $CU_N$. In other words, the target bit budget $BB_N$ is determined for the current coding unit $CU_N$ before the encoder 122 starts encoding pixel data of the current coding unit $CU_N$. As a result, it is possible that the actual encoded bit size of the current coding unit $CU_N$ is smaller than the target bit budget $BB_N$ allocated to the current coding unit $CU_N$. The encoder 112 is configured to append dummy bits to the encoded pixel data of the current coding unit $CU_N$ to make the sum of the actual encoded bit size of the current coding unit $CU_N$ (e.g., a length of encoded pixel data bits and associated header bits) and the number of added dummy bits equal to the target bit budget $BB_N$. In other words, a bit length of the added dummy bits is equal to the actual encoded bit length of the current coding unit $CU_N$ subtracted from the target bit budget $BB_N$ allocated to the current coding unit $CU_N$. Please refer to FIG. 8, which is a diagram illustrating an exemplary encoding result generated based on target bit budgets selected from candidate bit budgets. As shown in FIG. 8, the rate controller 114 determines the target bit budget for coding unit N is the candidate bit budget BIT_THR(1), and the actual encoded bit size of the coding unit N is smaller than BIT_THR(1). Hence, the encoder 112 appends dummy bits to the encoded pixel data of the coding unit N such that all bits allocated to the coding unit N are fully used. Similarly, the rate controller 114 determines the target bit budget for coding unit N+1 is the candidate bit budget BIT_THR(2) which is larger than the actual encoded bit size of the coding unit N+1, and the encoder 112 appends dummy bits to the encoded pixel data of the coding unit N+1 such that all bits allocated to the coding unit N+1 are fully used; and the rate controller 114 determines the target bit budget for coding unit N+2 is the candidate bit budget BIT_THR(0) which is larger than the actual encoded bit size of the coding unit N+2, and the encoder 112 appends dummy bits to the encoded pixel data of the coding unit N+2 such that all bits allocated to the coding unit N+1 are fully used. It should be noted that when the actual encoded bit size of one coding unit is equal to the target bit budget allocated to the coding unit, no dummy bit is required to be appended to the encoded pixel data of the coding unit.

With regard to the determination of the target bit budget $BB_N$ for the current coding unit $CU_N$, one or more parameters may be examined. For example, when the encoder 112 is encoding the current coding unit $CU_N$, the rate controller 114 may determine the target bit budget $BB_N$ by checking at least one of the following parameters: a current quantization step used for encoding the current coding unit $CU_N$, bit budget(s) allocated to previous coding unit(s) $CU_L$ (L<N), and a position of the current coding unit $CU_N$ within the access unit to be encoded. The quantization step would decide the encoded bit length of the current coding unit $CU_N$. The bit budgets allocated to previous coding units would decide whether there are remaining bits available for allowing a larger candidate bit budget to be selected as the target bit budget $BB_N$ for the current coding unit $CU_N$. In a preferred embodiment, the position of the current coding unit $CU_N$ to be encoded indicates how many coding units in the same access are not encoded yet. This may be considered to balance the number of times a smaller candidate bit budget is selected as a target bit budget and the number of times a larger candidate bit budget is selected as a target bit budget. In an alternative embodiment, the position of the current coding unit $CU_N$ may indicate whether the current coding unit $CU_N$ is part of a region of interest (ROI), where bit budget allocation for coding units in a ROI area may be different from bit budget allocation for coding units in a non-ROI area.

By way of example, unless a criterion of setting the target bit budget $BB_N$ is met, the rate controller 114 may control the encoder 112 to try using different quantization steps, from a smaller one to a largest one, to encode the current coding unit $CU_N$, where the criterion may be defined based on at least one of aforementioned parameters. However, this is for illustrative purposes only, and is not meant to be a limitation of the present invention. That is, the quantization step may be selected based on a different manner. To put it simply, any rate control design selecting a target bit budget from candidate bit budgets each having a pre-defined value falls within the scope of the present invention.

Figure 9:
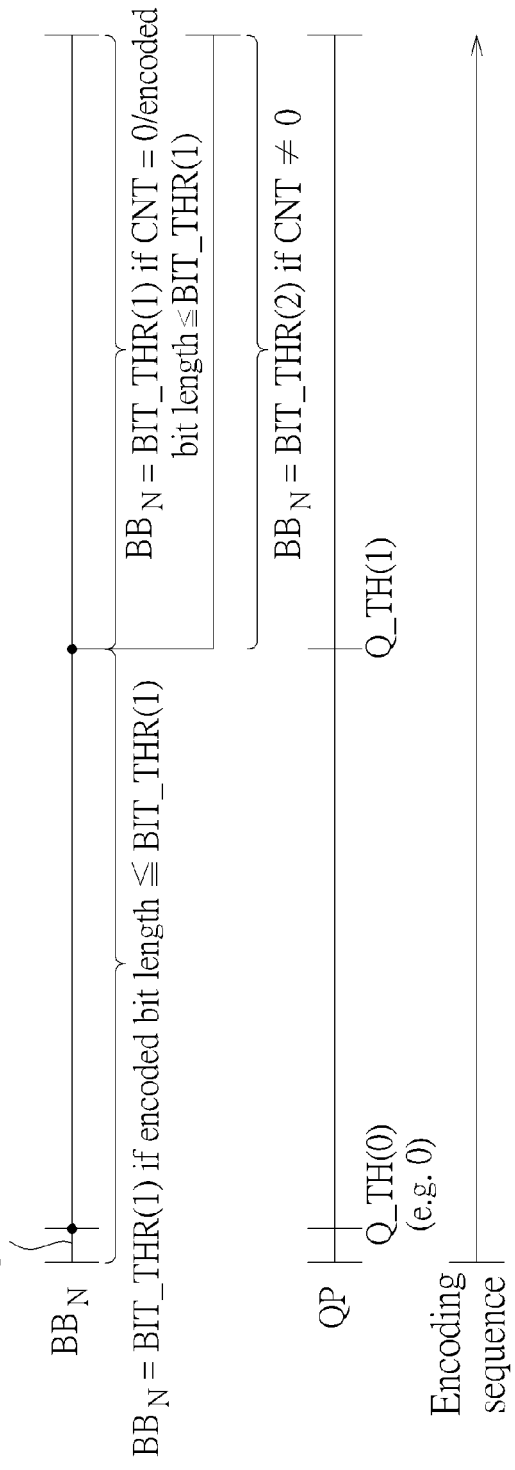
FIG. 9 is a diagram illustrating a rate control operation performed during encoding of the current coding unit according to an embodiment of the present invention.

Please refer to FIG. 9, which is a diagram illustrating a rate control operation performed during encoding of the current coding unit $CU_N$ according to an embodiment of the present invention. The rate controller 114 will instruct the encoder 112 to try possible quantization steps for finding one suitable quantization step which makes the encoded bit length meets one of the predetermined bit budgets. In this embodiment, the rate controller 114 does not stop increasing the quantization step until the target bit budget $BB_N$ for current coding unit $CU_N$ is determined. Initially, the rate controller 114 sets the quantization step by an initial value (e.g., QP=0), and the encoder 112 is instructed by the rate controller 114 to encode the current coding unit $CU_N$ using a lossless compression algorithm due to QP=0. In this embodiment, since the current quantization step does not exceed a predetermined threshold Q_TH(0) yet, the rate controller 114 first checks if a criterion of setting the target bit budget $BB_N$ by a candidate bit budget BIT_THR(0) (which is smaller than an expected average bit budget (e.g., BIT_THR(1)) is met by comparing an encoded bit length of the current coding unit $CU_N$ under the current quantization step (e.g., QP=0) with the candidate bit budget BIT_THR(0). When the encoded bit length of the current coding unit $CU_N$ under the current quantization step (e.g., QP=0) does not exceed the candidate bit budget BIT_THR (0), the criterion of setting the target bit budget $BB_N$ is met, and the rate controller 114 uses the candidate bit budget BIT_THR(0) as the target bit budget $BB_N$ (i.e., $BB_N$=BIT_THR(0)). Besides, the encoded pixel data of the current coding unit $CU_N$ generated under the current quantization step (e.g., QP=0) would be output as an encoding result of the current coding unit $CU_N$.

In a preferred embodiment, the predetermined threshold Q_TH(0) may be set by 0. Hence, the candidate bit budget BIT_THR(0) is allocated to the current coding unit $CU_N$ only when the encoded bit length of the current coding unit $CU_N$ under QP=0 does not exceed the candidate bit budget BIT_THR(0). However, this is not meant to be a limitation of the present invention. In an alternative design, the predetermined threshold Q_TH(0) may be set by a non-zero value. Thus, the current quantization step (e.g., QP=0) does not reach the predetermined threshold Q_TH(0) yet. In this case, when the encoded bit length of the current coding unit $CU_N$ under the current quantization step (e.g., QP=0) exceeds the candidate bit budget BIT_THR(0), the rate controller 114 further checks if a criterion of setting the target bit budget $BB_N$ by another candidate bit budget BIT_THR(1) (which is equal to the expected average bit budget) is met by comparing the encoded bit length of the current coding unit $CU_N$ under the current quantization step (e.g., QP=0) with the candidate bit budget BIT_THR(1). When the encoded bit length of the current coding unit $CU_N$ under the current quantization step (e.g., QP=0) does not exceed the candidate bit budget BIT_THR(1), the criterion of setting the target bit budget $BB_N$ is met, and the rate controller 114 uses the candidate bit budget BIT_THR(1) as the target bit budget $BB_N$ (i.e., $BB_N$=BIT_THR(1)). Besides, the encoded pixel data of the current coding unit $CU_N$ generated under the current quantization step (e.g., QP=0) would be output as an encoding result of the current coding unit $CU_N$.

When the encoded bit length of the current coding unit $CU_N$ under the current quantization step (e.g., QP=0) still exceeds the candidate bit budget BIT_THR(1), the rate controller 114 updates the quantization step by QP=1 (i.e., QP=QP+1). Similarly, supposing that the current quantization step (i.e., QP=1) does not exceed the predetermined threshold TH_Q(0) yet, the rate controller 114 checks if a criterion of setting the target bit budget $BB_N$ is met by comparing the encoded bit length of the current coding unit $CU_N$ under the current quantization step (e.g., QP=1) with the candidate bit budget BIT_THR(0). When the encoded bit length of the current coding unit $CU_N$ under the current quantization step (e.g., QP=1) does not exceed the candidate bit budget BIT_THR(0), the criterion of setting the target bit budget $BB_N$ is met, and the rate controller 114 uses the candidate bit budget BIT_THR(0) as the target bit budget $BB_N$ (i.e., $BB_N$=BIT_THR(0)). Besides, the encoded pixel data of the current coding unit $CU_N$ generated under the current quantization step (e.g., QP=1) would be output as an encoding result of the current coding unit $CU_N$. However, when the encoded bit length of the current coding unit $CU_N$ under the current quantization step (e.g., QP=1) exceeds the candidate bit budget BIT_THR(0), the rate controller 114 further checks if a criterion of setting the target bit budget $BB_N$ is met by comparing the encoded bit length of the current coding unit $CU_N$ under the current quantization step (e.g., QP=1) with the candidate bit budget BIT_THR(1). In a case where the encoded bit length of the current coding unit $CU_N$ under the current quantization step (e.g., QP=1) does not exceed the candidate bit budget BIT_THR(1), the criterion of setting the target bit budget $BB_N$ is met, and the rate controller 114 uses the candidate bit budget BIT_THR(1) as the target bit budget $BB_N$ (i.e., $BB_N$=BIT_THR(1)). Besides, the encoded pixel data of the current coding unit $CU_N$ generated under the current quantization step (e.g., QP=1) would be output as an encoding result of the current coding unit $CU_N$. In another case where the encoded bit length of the current coding unit $CU_N$ under the current quantization step (e.g., QP=1) exceeds the candidate bit budget BIT_THR(1), the rate controller 114 would update the current quantization step again (i.e., QP=2 due to QP=QP+1) to keep checking if the criterion of setting the target bit budget $BB_N$ by one of the candidate bit budgets BIT_THR(0) and BIT_THR(1) is met. In other words, the rate controller 114 does not stop updating the current quantization step until the criterion of setting the target bit budget $BB_N$ by one of the candidate bit budgets BIT_THR(0) and BIT_THR(1) is met or all quantization steps not exceeding the predetermined threshold Q_TH(0) have been tested.

Briefly summarized, as can be seen from FIG. 9, the target bit budget $BB_N$ is set by the candidate bit budget BIT_THR(0) only when an encoded bit length of the current coding unit $CU_N$ generated under a current quantization step does not exceed the candidate bit budget BIT_THR(0) and the current quantization step does not exceed the predetermined threshold Q_TH(0). Further, if the current quantization step does not exceed the predetermined threshold Q_TH(0), the target bit budget $BB_N$ is set by the candidate bit budget BIT_THR(1) when the encoded bit length of the current coding unit $CU_N$ generated under the current quantization step exceeds the candidate bit budget BIT_THR(0) but does not exceed the candidate bit budget BIT_THR(1).

If the criterion of setting the target bit budget $BB_N$ by one of the candidate bit budgets BIT_THR(0) and BIT_THR(1) cannot be met after all quantization steps not exceeding the predetermined threshold Q_TH(0) have been tested, the procedure of checking the criterion of setting the target bit budget $BB_N$ by the candidate bit budget BIT_THR(1) only is started with the current quantization step set by Q_TH(0)+1. In this embodiment, since the current quantization step does not reach another predetermined threshold Q_TH(1) yet (i.e., Q_TH(0)<QP<Q_TH(1)), the rate controller 114 checks if a criterion of setting the target bit budget $BB_N$ by the candidate bit budget BIT_THR(1) is met by comparing an encoded bit length of the current coding unit $CU_N$ under the current quantization step (e.g., QP=Q_TH(0)+1) with the candidate bit budget BIT_THR(1). When the encoded bit length of the current coding unit $CU_N$ under the current quantization step (e.g., QP=Q_TH(0)+1) does not exceed the candidate bit budget BIT_THR(1), the criterion of setting the target bit budget $BB_N$ is met, and the rate controller 114 uses the candidate bit budget BIT_THR(1) as the target bit budget $BB_N$ (i.e., $BB_N$=BIT_THR(1)). Besides, the encoded pixel data of the current coding unit $CU_N$ generated under the current quantization step (e.g., QP=Q_TH(0)+1) would be output as an encoding result of the current coding unit $CU_N$.

If the current quantization step (e.g., QP=Q_TH(0)+1) does not reach the predetermined threshold Q_TH(1) yet, the rate controller 114 updates the quantization step by QP=Q_TH(0)+2 (i.e., QP=QP+1) when the encoded bit length of the current coding unit $CU_N$ under the current quantization step (e.g., QP=Q_TH(0)+1) exceeds the candidate bit budget BIT_THR(1). Similarly, the rate controller 114 checks if a criterion of setting the target bit budget $BB_N$ is met by comparing the encoded bit length of the current coding unit $CU_N$ under the current quantization step (e.g., QP=Q_TH(0)+2) with the candidate bit budget BIT_THR(1). When the encoded bit length of the current coding unit $CU_N$ under the current quantization step (e.g., QP=Q_TH(0)+2) does not exceed the candidate bit budget BIT_THR(1), the criterion of setting the target bit budget $BB_N$ is met, and the rate controller 114 uses the candidate bit budget BIT_THR(1) as the target bit budget $BB_N$ (i.e., $BB_N$=BIT_THR(1)). Besides, the encoded pixel data of the current coding unit $CU_N$ generated under the current quantization step (e.g., QP=Q_TH(0)+2) would be output as an encoding result of the current coding unit $CU_N$. However, when the encoded bit length of the current coding unit $CU_N$ under the current quantization step (e.g., QP=Q_TH(0)+2) still exceeds the candidate bit budget BIT_THR(1), the rate controller 114 would update the current quantization step again to keep checking if the criterion of setting the target bit budget $BB_N$ by the candidate bit budget BIT_THR(1) is met. In other words, the rate controller 114 does not stop updating the current quantization step until the criterion of setting the target bit budget $BB_N$ by the candidate bit budget BIT_THR(1) is met or all quantization steps larger than the predetermined threshold Q_TH(0) and smaller than the predetermined threshold Q_TH(1) have been tested.

Briefly summarized, as can be seen from FIG. 9, the target bit budget $BB_N$ is set by the candidate bit budget BIT_THR(1) when an encoded bit length of the current coding unit $CU_N$ generated under a current quantization step does not reach the candidate bit budget BIT_THR(1) and the current quantization step is between the predetermined thresholds Q_TH(0) and Q_TH(1).

Please note that, regarding all quantization step(s) smaller than or equal to the predetermined threshold Q_TH(0), the procedure of checking if the criterion of setting the target bit budget $BB_N$ by the candidate bit budget BIT_THR(0) is performed first, and the procedure of checking if the criterion of setting the target bit budget $BB_N$ by the candidate bit budget BIT_THR(1) is performed under the condition that the criterion of setting the target bit budget $BB_N$ by the candidate bit budget BIT_THR(0) cannot be met. Thus, for each quantization step smaller than or equal to the predetermined threshold Q_TH(0), the target bit budget $BB_N$ may be set by BIT_THR(0) when the corresponding encoded bit length does not exceed the candidate bit budget BIT_THR(0), and may be set by BIT_THR(1) when the corresponding encoded bit length exceeds the candidate bit budget BIT_THR(0) but does not exceed the candidate bit budget BIT_THR(1). In addition, for each quantization step larger than the predetermined threshold Q_TH(0) and smaller than the predetermined threshold Q_TH(1), the target bit budget $BB_N$ is set by BIT_THR(1) when the corresponding encoded bit length does not exceed BIT_THR(1).

If the criterion of setting the target bit budget $BB_N$ by the candidate bit budget BIT_THR(1) cannot be met after all quantization steps smaller than the predetermined threshold Q_TH(1) have been tested, the rate controller 114 decides whether the candidate bit budget BIT_THR(1) or another candidate bit budget BIT_THR(2) (which is larger than the candidate bit budget BIT_THR(1)) is used as the target bit budget $BB_N$ by at least referring to remaining bit information indicative of accumulated remaining bits resulting from bit budget allocation of previous coding unit(s) in the same access unit. The candidate bit budget BIT_THR(0) is smaller than an expected average bit budget $$\left(\text{i.e., } \frac{BB_{AU}}{M}\right)$$

for coding units within the access unit, the candidate bit budget BIT_THR(1) is equal to the expected average bit budget, and the candidate bit budget BIT_THR(2) is larger than the expected average bit budget. When a specific coding unit within the access unit is assigned with a target bit budget set by the smaller candidate bit budget BIT_THR(0), the difference between candidate bit budgets BIT_THR(0) and BIT_THR(1) may be regarded as remaining bits saved by bit budget allocation of the specific coding unit. On the contrary, when a specific coding unit within the access unit is assigned with a target bit budget set by the larger candidate bit budget BIT_THR(2), the difference between candidate bit budgets BIT_THR(2) and BIT_THR(1) may be regarded as additional bits consumed by bit budget allocation of the specific coding unit.

In an exemplary design, the difference between candidate bit budgets BIT_THR(0) and BIT_THR(1) and the difference between candidate bit budgets BIT_THR(2) and BIT_THR (1) may be accumulated to generate an accumulation value indicative of the number of accumulated remaining bits, where the accumulation value is increased each time the candidate bit budget BIT_THR(0) is selected as a target bit budget, the accumulation value is unchanged each time the candidate bit budget BIT_THR(1) is selected as a target bit budget, and the accumulation value is decreased each time the candidate bit budget BIT_THR(2) is selected as a target bit budget.

In an alternative design, during the encoding procedure of the access unit, a budget counter may be used by the rate controller 114 to maintain a count value CNT, where the count value CNT is updated each time one of the candidate bit budgets BIT_THR(0) and BIT_THR(2) is selected as a target bit budget. Specifically, the rate controller 114 resets the budget counter before the rate control starts (i.e., before the encoder 112 starts encoding the access unit). The count value CNT is increased (e.g., CNT=CNT+1) when the candidate bit budget BIT_THR(0) is selected as a target bit budget, and is decreased (e.g., CNT=CNT-1) when the candidate bit budget BIT_THR(2) is selected as a target bit budget. That is, the remaining bit information indicative of accumulated remaining bits resulting from bit budget allocation of previous coding unit(s) in the access unit is recorded by the count value CNT of the budget counter. Hence, the larger is the count value CNT, the number of accumulated remaining bits is larger; and vice versa. More specifically, when BIT_THR (0)= BIT_THR(1)−BIT_offset and BIT_THR(2)=BIT_THR (1)+BIT_offset, the number of accumulated remaining bits is equal to CNT*(BIT_THR(1)−BIT_THR(0)). Compared to storing the number of remaining bits directly, storing the count value CNT requires fewer bits, thus relaxing the buffer requirement.

As mentioned above, the candidate bit budget BIT_THR (2) is larger than the expected average bit budget $$\left(\text{i.e., } \frac{BB_{AU}}{M}\right).$$

When these are remaining bits saved by previous coding unit(s) in the access unit (i.e., CNT≠0), this means that the candidate bit budget BIT_THR(2) may be used as a target bit budget, and would consume at least a portion (i.e., part or all) of the remaining bits when selected as the target bit budget. However, when these are no remaining bits saved by previous coding unit(s) in the access unit (i.e., CNT=0), this means that the candidate bit budget BIT_THR(2) is not allowed to be used as a target bit budget.

In a first exemplary design for determining the target bit budget $BB_N$ under the condition that the current quantization step reaches the predetermined threshold Q_TH(1) (i.e., QP≥Q_TH(1)), the procedure of checking if the criterion of setting the target bit budget $BB_N$ by the candidate bit budget BIT_THR(1) is performed first, and the procedure of checking if the criterion of setting the target bit budget $BB_N$ by the candidate bit budget BIT_THR(2) is performed only when the criterion of setting the target bit budget $BB_N$ by the candidate bit budget BIT_THR(1) cannot be met. That is, the rate controller 114 first checks if a criterion of setting the target bit budget $BB_N$ by the candidate bit budget BIT_THR(1) is met by comparing an encoded bit length of the current coding unit $CU_N$ under the current quantization step (e.g., QP=Q_TH(1)) with the candidate bit budget BIT_THR(1). When the encoded bit length of the current coding unit $CU_N$ under the current quantization step (e.g., QP=Q_TH(1)) does not exceed the candidate bit budget BIT_THR(1), the criterion of setting the target bit budget $BB_N$ is met, and the rate controller 114 uses the candidate bit budget BIT_THR(1) as the target bit budget $BB_N$ (i.e., $BB_N$=BIT_THR(1)). When the encoded bit length of the current coding unit $CU_N$ under the current quantization step (e.g., QP=Q_TH(1)) exceeds the candidate bit budget BIT_THR(1), the rate controller 114 further decides if a criterion of setting the target bit budget $BB_N$ by another candidate bit budget BIT_THR(2) is met by obtaining the count value CNT from the budget counter and comparing the encoded bit length of the current coding unit $CU_N$ under the current quantization step (e.g., QP=Q_TH(1)) with the candidate bit budget BIT_THR(2). When the encoded bit length of the current coding unit $CU_N$ under the current quantization step (e.g., QP=Q_TH(1)) does not exceed the candidate bit budget BIT_THR(2) and CNT≠0, the criterion of setting the target bit budget $BB_N$ is met, and the rate controller 114 uses the candidate bit budget BIT_THR(2) as the target bit budget $BB_N$ (i.e., $BB_N$=BIT_THR(2)).

However, when the encoded bit length of the current coding unit $CU_N$ under the current quantization step (e.g., QP=Q_TH(1)) exceeds the candidate bit budget BIT_THR (2) or CNT=0, the rate controller 114 updates the quantization step by QP=Q_TH(1)+1 (i.e., QP=QP+1). Similarly, after the quantization step is updated, the rate controller 114 first checks if a criterion of setting the target bit budget $BB_N$ is met by comparing the encoded bit length of the current coding unit $CU_N$ under the current quantization step (e.g., QP=Q_TH (1)+1) with the candidate bit budget BIT_THR(1). When the encoded bit length of the current coding unit $CU_N$ under the current quantization step (e.g., QP=Q_TH(1)+1) does not exceed the candidate bit budget BIT_THR(1), the criterion of setting the target bit budget $BB_N$ is met, and the rate controller 114 uses the candidate bit budget BIT_THR(1) as the target bit budget $BB_N$ (i.e., $BB_N$=BIT_THR(1)). However, when the encoded bit length of the current coding unit $CU_N$ under the current quantization step (e.g., QP=Q_TH(1)+1) exceeds the candidate bit budget BIT_THR(1), the rate controller 114 checks if a criterion of setting the target bit budget $BB_N$ is met by referring to the count value CNT and comparing the encoded bit length of the current coding unit $CU_N$ under the current quantization step (e.g., QP=Q_TH(1)+1) with the candidate bit budget BIT_THR(2). In a case where the encoded bit length of the current coding unit $CU_N$ under the current quantization step (e.g., QP=Q_TH(1)+1) does not exceed the candidate bit budget BIT_THR(2) and CNT≠0, the criterion of setting the target bit budget $BB_N$ is met, and the rate controller 114 uses the candidate bit budget BIT_ THR(2) as the target bit budget $BB_N$ (i.e., $BB_N$=BIT_THR (2)). In another case where the encoded bit length of the current coding unit $CU_N$ under the current quantization step (e.g., QP=Q_TH (1)+1) exceeds the candidate bit budget BIT_THR(2) or CNT=0, the rate controller 114 would update the current quantization step again (i.e., QP=Q_TH(1)+2 due to QP=QP+1) to keep checking if the criterion of setting the target bit budget $BB_N$ by one of the candidate bit budgets BIT_THR(1) and BIT_THR(2) is met. In other words, when the quantization step reaches Q_TH(1), the rate controller 114 does not stop updating the current quantization step until the criterion of setting the target bit budget $BB_N$ by one of the candidate bit budgets BIT_THR(1) and BIT_THR(2) is met.

Concerning the first exemplary design for determining the target bit budget $BB_N$ under the condition that the current quantization step reaches the predetermined threshold Q_TH (1), the target bit budget $BB_N$ is set by the candidate bit budget BIT_THR(1) as long as the encoded bit length of the current coding unit $CU_N$ does not exceed the candidate bit budget BIT_THR(1). In other words, the target bit budget $BB_N$ is set by the candidate bit budget BIT_THR(1) no matter whether the count value CNT is equal to zero or not. With regard to the other candidate bit budget BIT_THR(2), the target bit budget $BB_N$ is set by the candidate bit budget BIT_THR(2) when the encoded bit length of the current coding unit $CU_N$ does not exceed the candidate bit budget BIT_THR(2) and the count value CNT is a non-zero value. In other words, when the count value CNT is a zero value, the target bit budget $BB_N$ is allowed to be set by candidate bit budget BIT_THR(1) only; and when the count value CNT is a non-zero value, the target bit budget $BB_N$ may be set by the candidate bit budget BIT_THR(1) or the candidate bit budget BIT_THR(2). Hence, considering the case where the quantization step is not smaller than the predetermined threshold Q_TH(1) and the count value CNT is a non-zero value, using the count value CNT is unable to tell which of candidate bit budgets BIT_THR(1) and BIT_THR(2) is used as the target bit budget $BB_N$. Therefore, when the rate controller 114 employs the first exemplary design to determine the target bit budget $BB_N$ for the quantization step which reaches the predetermined threshold Q_TH(1), the header of encoded pixel data of one coding unit is required to have bit budget information (e.g., a bit budget index of the selected candidate bit budget) included therein to directly inform the image decoding apparatus 104 of the target bit budget allocated to the coding unit by the image encoding apparatus 102 if the count value CNT is a non-zero value when the target bit budget $BB_N$ is decided.

In a second exemplary design for determining the target bit budget $BB_N$ under the condition that the current quantization step reaches the predetermined threshold Q_TH(1) (i.e., $QP \geq Q\_TH(1)$), the target bit budget $BB_N$ is set based on the count value CNT. When CNT=0, the candidate bit budget BIT_THR(1) is required to be used as the target bit budget $BB_N$ since there are no remaining bits available now. When CNT≠0, the candidate bit budget BIT_THR(2) is used as the target bit budget $BB_N$ since there are remaining bits available now. More specifically, when CNT≠0, a proper quantization step which makes the encoded bit length of the current coding unit $CU_N$ not exceed the candidate bit budget BIT_THR(2) will be found by a quantization step update procedure; and when CNT=0, a proper quantization step which makes the encoded bit length of the current coding unit $CU_N$ not exceed the candidate bit budget BIT_THR(1) will be found by a quantization step update procedure.

Concerning the second exemplary design for determining the target bit budget $BB_N$ under the condition that the current quantization step reaches the predetermined threshold Q_TH(1), the target bit budget $BB_N$ is set by the candidate bit budget BIT_THR(1) if CNT=0, and is set by the candidate bit budget BIT_THR(2) if CNT≠0. In other words, when the count value CNT is a non-zero value, the target bit budget $BB_N$ finally set by the rate controller 114 must be the candidate bit budget BIT_THR(2), and when the count value CNT is a zero value, the target bit budget $BB_N$ finally set by the rate controller 114 must be the candidate bit budget BIT_THR(1). Hence, using the count value CNT is able to tell which of candidate bit budgets BIT_THR(1) and BIT_THR(2) is used as the target bit budget $BB_N$. When the rate controller 114 employs the second exemplary design to determine the target bit budget $BB_N$ for the quantization step which reaches the predetermined threshold Q_TH(1), there is no need to store bit budget information (e.g., a bit budget index of the selected candidate bit budget) in the header of encoded pixel data of the coding unit due to the fact that the count value CNT accumulated at the image decoding apparatus 104 can indicate the bit budget of the coding unit when the quantization step used for encoding the coding unit is found equal to or larger than the predetermined threshold Q_TH(1) after parsing the quantization parameter in the header of the coding unit.

As mentioned above, the number of accumulated remaining bits (or the count value CNT) is increased each time the candidate bit budget BIT_THR(0) (which is smaller than the expected average bit budget $$\frac{BB_{AU}}{M})$$

is selected as a target bit budget, and the number of accumulated remaining bits (or the count value CNT) is decreased each time the candidate bit budget BIT_THR(2) (which is larger than the expected average bit budget $$\frac{BB_{AU}}{M})$$

is selected as a target bit budget. To make the sum of bit budgets allocated to coding units within the access unit equal to the predetermined bit budget $BB_{AU}$ allocated to the access unit, the number of times the candidate bit budget BIT_THR(0) is selected as a target bid budget and the number of times the candidate bit budget BIT_THR(2) is selected as a target bid budget should be controlled properly.

Regarding the rate control operation shown in FIG. 9, the target bit budget $BB_N$ is mainly determined after the encoder 112 generates encoded pixel data of the current coding unit $CU_N$ based on a quantization step configured by the rate controller 114. However, there may be some exceptions that the encoded bit length of the current coding unit $CU_N$ does not dominate the decision of the target bit budget $BB_N$. For example, when the balance between the number of times the candidate bit budget BIT_THR(0) is selected as a target bid budget and the number of times the candidate bit budget BIT_THR(2) is selected as a target bid budget is taken into consideration, the count value CNT and the position of the current coding unit $CU_N$ in the access unit (i.e., the number of coding units not encoded yet) are checked to set the target bit budget $BB_N$.

For example, when finding that N1=N2−N3, the rate controller 114 directly uses a largest candidate bit budget (e.g., BIT_THR(2)) among the candidate bit budgets as the target bit budget $BB_N$ for the current coding unit $CU_N$, where N1 is the number of accumulated remaining bits resulting from bit budget allocation of previous coding unit(s) within the access unit (e.g., CNT*BIT_offset), N3 is a product of the number of coding unit(s) not encoded yet and the expected average bit budget (e.g., N3=$N_{CU\_E}$*BIT_THR(1)), and N2 is a product of the number of the coding unit(s) not encoded yet and the largest candidate bit budget (e.g., $N_{CU\_E}$*BIT_THR(2)). In a preferred embodiment, BIT_THR(0)=BIT_THR(1)−BIT_offset, BIT_THR(2)=BIT_THR(1)+BIT_offset, and the count value CNT is used to record the remaining bit information. Hence, when the number $N_{CU\_E}$ of coding units in the access unit that are not encoded yet is equal to the count value CNT (i.e., $N_{CU\_E}$=CNT), the candidate bit budget BIT_THR(2) is directly used as the target bit budget for each of the coding units not encoded yet.

For another example, when finding that N1=N2'−N3' under the condition that QP≤Q_TH(0) and the encoded bit length does not exceed BIT_THR(0), the rate controller 114 selects a specific candidate bit budget (e.g., BIT_THR(1)) equal to the expected average bit budget as the target bit budget $BB_N$ for the current coding unit $CU_N$, where N1 is the number of accumulated remaining bits resulting from bit budget allocation of previous coding unit(s) within the access unit, N2' is equal to a product of ($N_{CU\_E}$−1) and a largest candidate bit budget (e.g., BIT_THR(2)) among the candidate bit budgets, N3' is equal to a product of ($N_{CU\_E}$−1) and the expected average bit budget (e.g., BIT_THR(1)), and $N_{CU\_E}$ is the number of coding unit(s) within the access unit that are not encoded yet. In a preferred embodiment, BIT_THR(0)=BIT_THR(1) offset, BIT_THR(2)=BIT_THR(1)+BIT_offset, and the count value CNT is used to record the remaining bit information. Hence, when the number $N_{CU\_E}$ of coding units in the access unit that are not encoded yet is equal to the count value CNT plus one (i.e., $N_{CU\_E}$=CNT+1), the candidate bit budget BIT_THR(0) cannot be selected for the current coding unit $CU_N$. Thus, even though $N_{CU\_E}$=CNT+1, the target bit budget $BB_N$ is still allowed to be set by BIT_THR(1) or BIT_THR(2).

Figure 10:
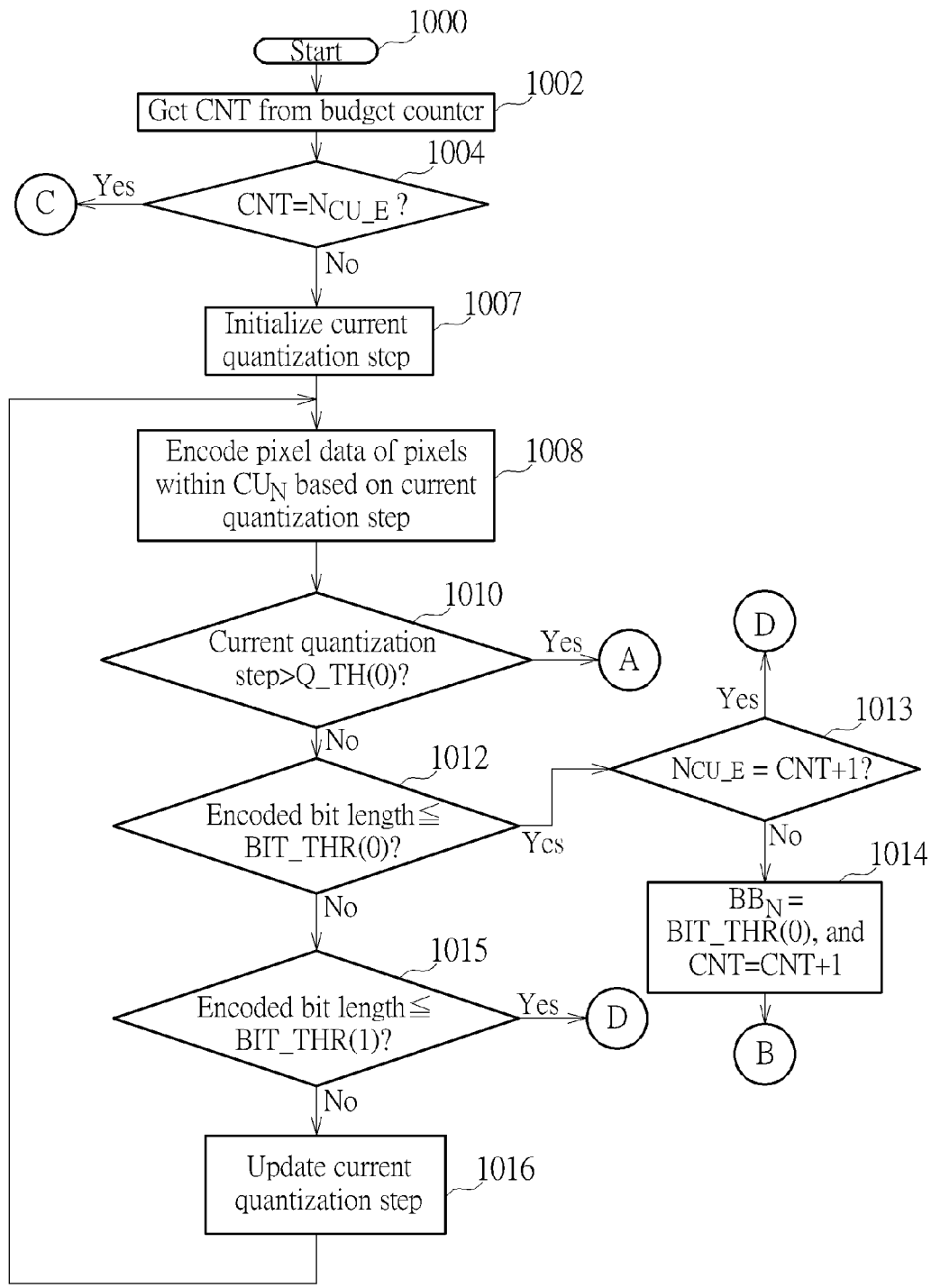
FIG. 10 is a flowchart illustrating an image encoding method with rate control according to an embodiment of the present invention.
Figure 11:
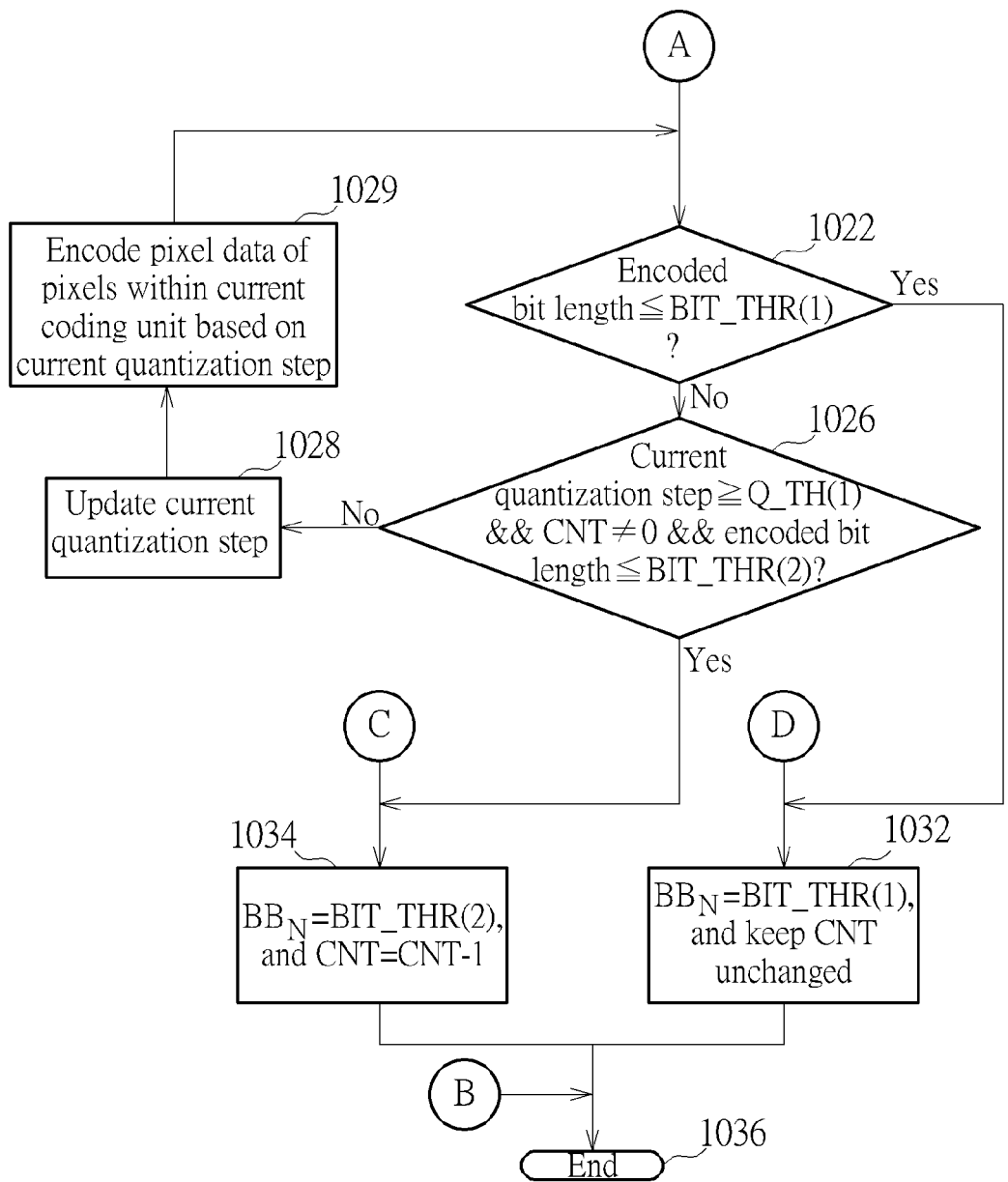
FIG. 11 is a continued flowchart of the image encoding method shown in FIG. 10.

FIG. 10 is a flowchart illustrating an image encoding method with rate control according to an embodiment of the present invention. FIG. 11 is a continued flowchart of the image encoding method shown in FIG. 10. Provided that the result is substantially the same, the steps are not required to be executed in the exact order shown in FIG. 10 and FIG. 11. Besides, additional steps may be inserted, and/or existing steps may be omitted. Suppose that three candidate bit budgets BIT_THR(0), BIT_THR(1), and BIT_THR(2) are used, where $$BIT\_THR(1) = \frac{BB_{AU}}{M},$$

BIT_THR(0)=BIT_THR(1)−BIT_offset, and BIT_THR(2)=BIT_THR(1)+BIT_offset; and the budget counter is used to generate a count value CNT which records remaining bit information indicative of accumulated remaining bits resulting from bit budget allocation of previous coding unit(s) in the same access unit where the current coding unit $CU_N$ to be encoded is located. The operation of determining the target bit budget $BB_N$ for the current coding unit $CU_N$ may be performed by the image encoding apparatus 102 and may be briefly summarized as below.

Step 1000: Start.

Step 1002: Read a count value CNT from a budget counter, wherein the count value CNT is reset to an initial value (e.g., 0) before the rate control of encoding an access unit AU starts.

Step 1004: Check if the count value CNT is equal to the number $N_{CU\_E}$ of coding unit(s) within the access unit AU that are not encoded yet (i.e., CNT=$N_{CU\_E}$?). If yes, go to step 1034; otherwise, go to step 1007. Generally, step 1004 is to check if N1=N2−N3, where N1 is the number of accumulated remaining bits resulting from bit budget allocation of previous coding unit(s) within the access unit AU, N3 is a product of the number of coding unit(s) in the access unit AU that are not encoded yet and an expected average bit budget (e.g., BIT_THR(1)), and N2 is a product of the number of the coding unit(s) not encoded yet and the largest candidate bit budget (e.g., BIT_THR(2)).

Step 1007: Set a current quantization step by an initial value (e.g., QP=0).

Step 1008: Encode pixel data of the pixels within the current coding unit $CU_N$ based on the current quantization step.

Step 1010: Check if the current quantization step exceeds a first predetermined threshold Q_TH(0). If yes, go to step 1022; otherwise, go to step 1012.

Step 1012: Check if an encoded bit length of the current coding unit $CU_N$ under the current quantization step is smaller than or equal to the candidate bit budget BIT_THR(0). If yes, go to step 1013; otherwise, go to step 1015.

Step 1013: Check if the number $N_{CU\_E}$ of coding unit(s) within the access unit AU that are not encoded yet is equal to the count value CNT plus one (i.e., $N_{CU\_E}$=CNT+1?). If yes, go to step 1032; otherwise, go to step 1014. Generally, step 1013 is to check if N1=N2'−N3', where N2' is equal to a product of ($N_{CU\_E}$−1) and the largest candidate bit budget BIT_THR(2), and N3' is equal to a product of ($N_{CU\_E}$−1) and the expected average bit budget (e.g., BIT_THR(1)).

Step 1014: Use the candidate bit budget BIT_THR(0) as the target bit budget $BB_N$, and update the count value (e.g., CNT=CNT+1). Go to step 1036.

Step 1015: Check if the encoded bit length of the current coding unit $CU_N$ under the current quantization step is smaller than or equal to the candidate bit budget BIT_THR(1). If yes, go to step 1032; otherwise, go to step 1016.

Step 1016: Update the current quantization step (e.g., QP=QP+1). Go to step 1008.

Step 1022: Check if the encoded bit length of the current coding unit $CU_N$ under the current quantization step is smaller than or equal to the candidate bit budget BIT_THR(1). If yes, go to step 1032; otherwise, go to step 1026.

Step 1026: Check if the current quantization step reaches a second predetermined threshold Q_TH(1) (which is larger than the first predetermined threshold Q_TH(0)), the count value CNT is a non-zero value, and the encoded bit length of the current coding unit $CU_N$ under the current quantization step is smaller than or equal to the candidate bit budget BIT_THR(2). If yes, go to step 1034; otherwise, go to step 1028.

Step 1028: Update the current quantization step (e.g., QP=QP+1).

Step 1029: Encode pixel data of the pixels within the current coding unit $CU_N$ based on the current quantization step. Go to step 1022.

Step 1032: Use the candidate bit budget BIT_THR(1) as the target bit budget $BB_N$, and keep the count value CNT unchanged. Go to step 1036.

Step 1034: Use the candidate bit budget BIT_THR(2) as the target bit budget $BB_N$, and update the count value CNT (e.g., CNT=CNT−1).

Step 1036: End.

As a person skilled in the pertinent art can readily understand details of each step shown in FIG. 10 and FIG. 11 after reading above paragraphs, further description is omitted here for brevity.

Figure 12:
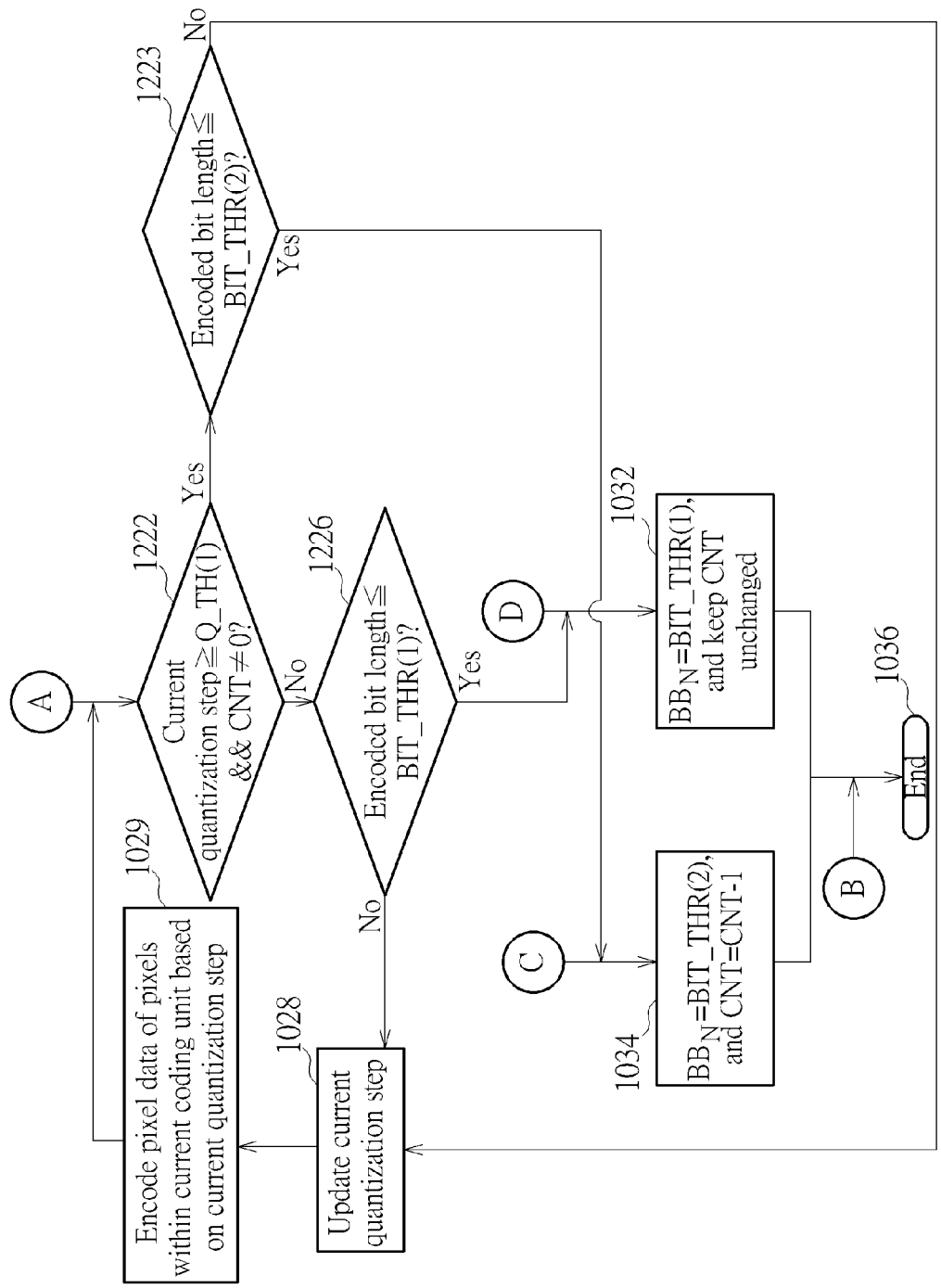
FIG. 12 is a flowchart illustrating an alternative design of the flow shown in FIG. 11.

In the partial flow shown in FIG. 11, the aforementioned first exemplary design for determining the target bit budget $BB_N$ under the condition that the current quantization step reaches the predetermined threshold Q_TH(1) is employed. Alternatively, the aforementioned second exemplary design for determining the target bit budget $BB_N$ under the condition that the current quantization step reaches the predetermined threshold Q_TH(1) may be employed. FIG. 12 is a flowchart illustrating an alternative design of the flow shown in FIG. 11. The difference between flows in FIG. 11 and FIG. 12 includes steps 1222, 1223 and 1226, as follows.

Step 1222: Check if the current quantization step reaches a second predetermined threshold Q_TH(1) (which is larger than the first predetermined threshold Q_TH(0)) and the count value CNT is a non-zero value. If yes, go to step 1223; otherwise, go to step 1226.

Step 1223: Check if the encoded bit length of the current coding unit $CU_N$ under the current quantization step is smaller than or equal to the candidate bit budget BIT_THR(2). If yes, go to step 1034; otherwise, go to step 1028.

Step 1226: Check if the encoded bit length of the current coding unit $CU_N$ under the current quantization step is smaller than or equal to the candidate bit budget BIT_THR(1). If yes, go to step 1032; otherwise, go to step 1028.

As a person skilled in the pertinent art can readily understand details of each step shown in FIG. 12 after reading above paragraphs, further description is omitted here for brevity.

The rate control mechanism mentioned above is not limited to a rate controller design using three candidate bit budgets BIT_THR(0), BIT_THR(1) and BIT_THR(2). That is, the rate control mechanism can be applied to a rate controller design using more than three candidate bit budgets. For example, considering the case where the rate controller 114 is configured to use five candidate bit budgets BIT_THR(0), BIT_THR(1), BIT_THR(2), BIT_THR(3), and BIT_THR (4). In one exemplary embodiment, BIT_THR(2) is set by an expected average bit budget $$\frac{BB_{AU}}{M},$$

BIT_THR(1)=BIT_THR(2)−BIT_offset1, BIT_THR (3)=BIT_THR(2)+BIT_offset1, BIT_THR(0)=BIT_THR (2)−BIT_offset2, and BIT_THR(4)=BIT_THR(2)+BIT_offset2, where 1≤BIT_offset1≤BIT_offset2. Besides, multiple budget counters may be used by the rate controller 114 to generate a plurality of count values CNT(0) and CNT(1) to record remaining bit information indicative of accumulated remaining bits resulting from bit budget allocation of previous coding unit(s) in the access unit. By way of example, but not limitation, the count value CNT(0) is increased (e.g., CNT(0)=CNT(0)+1) when the candidate bit budget BIT_THR(0) is selected as a target bit budget, and is decreased (e.g., CNT(0)=CNT(0)−1) when the candidate bit budget BIT_THR(4) is selected as a target bit budget; the count value CNT(1) is increased (e.g., CNT(1)=CNT(1)+1) when the candidate bit budget BIT_THR(1) is selected as a target bit budget, and is decreased (e.g., CNT(1)=CNT(1)−1) when the candidate bit budget BIT_THR(3) is selected as a target bit budget; and none of the count values CNT(0) and CNT(1) is changed when the candidate bit budget BIT_THR(2) is selected as a target bit budget.

Similarly, when the encoder 112 is encoding the current coding unit $CU_N$, the rate controller 114 may determine the target bit budget $BB_N$ by checking at least one of the following parameters: a current quantization step used for encoding the current coding unit $CU_N$, one bit budget allocated to at least one previous coding unit $CU_L$ (L<N), and a position of the current coding unit $CU_N$ within the access unit. Please refer to FIG. 13, which is a diagram illustrating a rate control operation performed during encoding of the current coding unit $CU_N$ according to another embodiment of the present invention. In this example, four predetermined thresholds Q_TH(0)−Q_TH(4) are set by the rate controller 114. Initially, the procedure of checking if the criterion of setting the target bit budget $BB_N$ by one of the candidate bit budgets BIT_THR(0), BIT_THR(1) and BIT_THR(2) is performed for a quantization step smaller than or equal to the predetermined threshold Q_TH(0), where for each quantization step not exceeding the predetermined threshold Q_TH(0), the candidate bit budgets BIT_THR(0), BIT_THR(1) and BIT_THR (2) will be checked sequentially. The procedure of checking if the criterion of setting the target bit budget $BB_N$ by one of the candidate bit budgets BIT_THR(1) and BIT_THR(2) is performed under the condition that the criterion of setting the target bit budget $BB_N$ by one of the candidate bit budgets BIT_THR(0), BIT_THR(1) and BIT_THR(2) cannot be met after all quantization steps not exceeding the predetermined threshold Q_TH(0) have been tested, where for each quantization step exceeding the predetermined threshold Q_TH(0) and not exceeding the predetermined threshold Q_TH(1), the candidate bit budgets BIT_THR(1) and BIT_THR(2) will be checked sequentially. The procedure of checking if the criterion of setting the target bit budget $BB_N$ by the candidate bit budget BIT_THR(2) is performed under the condition that the criterion of setting the target bit budget $BB_N$ by one of the candidate bit budgets BIT_THR(1) and BIT_THR(2) cannot be met after all quantization steps exceeding the predetermined threshold Q_TH(0) and not exceeding the predetermined threshold Q_TH(1) have been tested.

Figure 13:
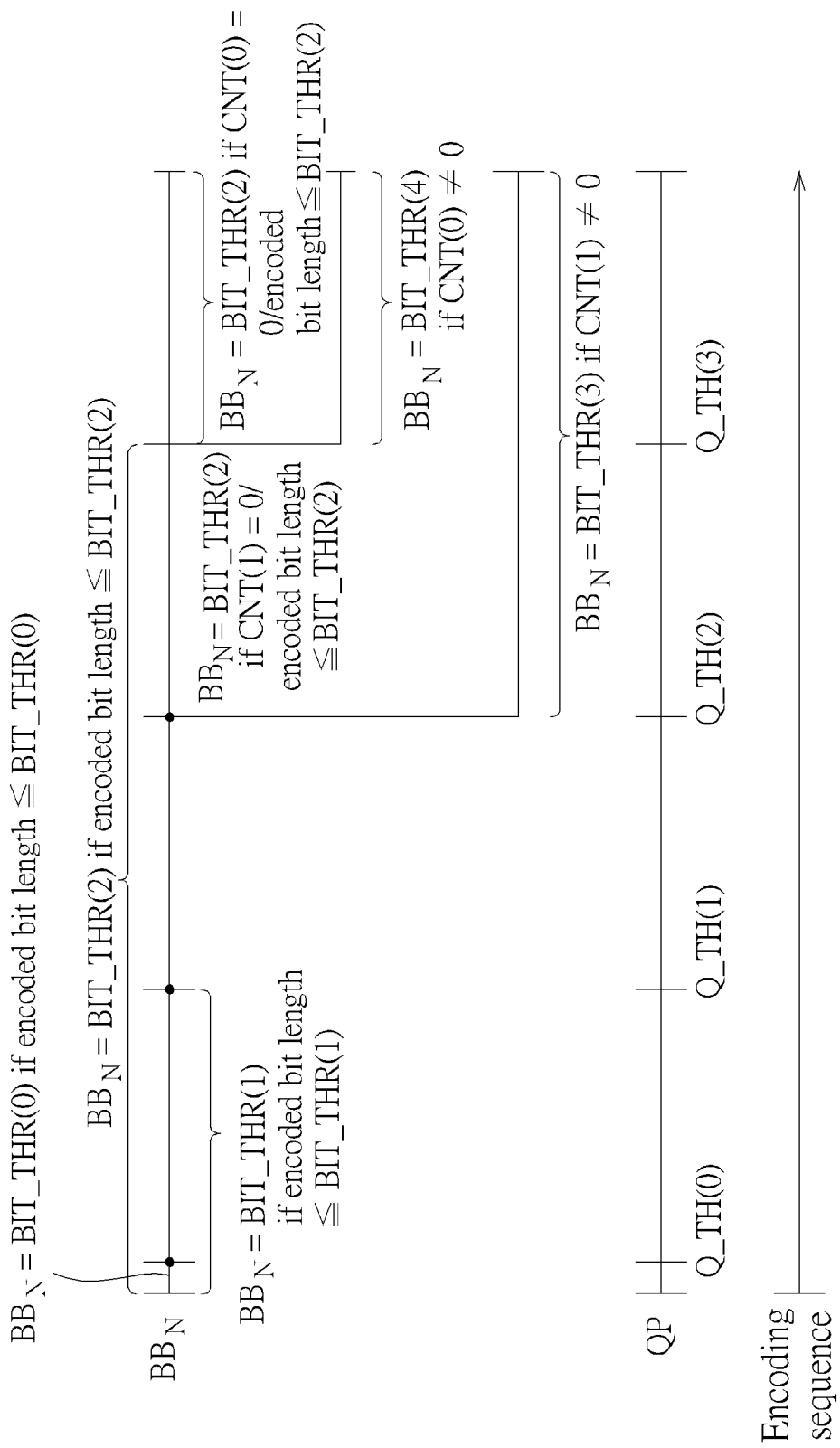
FIG. 13 is a diagram illustrating a rate control operation performed during encoding of the current coding unit according to another embodiment of the present invention.

Besides, as can be seen from FIG. 13, the target bit budget $BB_N$ is set by the candidate bit budget BIT_THR(3) if the current quantization step reaches the predetermined threshold Q_TH(2) and does not exceed the predetermined threshold Q_TH(3), and the count value CNT(1) is not equal to zero; the target bit budget $BB_N$ is set by the candidate bit budget BIT_THR(2) if the current quantization step reaches the predetermined threshold Q_TH(2) and does not exceed the predetermined threshold Q_TH(3), and the encoded bit length is equal to or smaller than the candidate bit budgets BIT_THR(2) ($1^{st}$ exemplary design similar to that shown in FIG. 11); and the target bit budget $BB_N$ is set by the candidate bit budget BIT_THR(2) if the current quantization step reaches the predetermined threshold Q_TH(2) and does not exceed the predetermined threshold Q_TH(3), and the count value CNT(1) is equal to zero ($2^{nd}$ exemplary design similar to that shown in FIG. 12).

Further, as can be seen from FIG. 13, the target bit budget $BB_N$ is set by the candidate bit budget BIT_THR(4) if the current quantization step reaches the predetermined threshold Q_TH(3) and the count value CNT(0) is not equal to zero; the target bit budget $BB_N$ is set by the candidate bit budget BIT_THR(2) if the current quantization step reaches the predetermined threshold Q_TH(3) and the encoded bit length is equal to or smaller than the candidate bit budgets BIT_THR(2) ($1^{st}$ exemplary design similar to that shown in FIG. 11); and the target bit budget $BB_N$ is set by the candidate bit budget BIT_THR(2) if the current quantization step reaches the predetermined threshold Q_TH(3) and the count value CNT(0) is equal to zero ($2^{nd}$ exemplary design similar to that shown in FIG. 12).

As a person skilled in the art can readily understand details of the rate control operation shown in FIG. 13 after reading above paragraphs directed to the rate control operation shown in FIG. 9, further description is omitted here for brevity.

It should be noted that the rate control operation shown in FIG. 13 is for illustrative purposes only, and is not meant to be a limitation of the present invention. In an alternative design, the candidate bit budget BIT_THR(3) is not necessarily paired with the candidate bit budget BIT_THR(1), and/or the candidate bit budget BIT_THR(4) is not necessarily paired with the candidate bit budget BIT_THR(0). For example, M candidate bit budgets BIT_THR(0)−BIT_THR(M−1) and N budget counters used for generating count values CNT(0)−

CNT(N−1) are used by the rate controller 114, where M>N and the candidate bit budget BIT_THR(N) is equal to an expected average bit budget. The count values CNT(0)–CNT(N−1) are used to record remaining bit information indicative of accumulated remaining bits resulting from bit budget allocation of previous coding unit(s) in the access unit. Hence, when the quantization step is increased to be a large value exceeding a predetermined threshold, the sum of count values CNT(0)–CNT(N−1) may be checked to see if there are accumulated remaining bits enough for allowing one of candidate bit budgets BIT_THR(N+1)–BIT_THR(M−1), each being larger than the expected average bit budget (i.e., BIT_THR (N)), to be selected as the target bit budget $BB_N$ for the current coding unit $CU_N$. Besides, the count value CNT(0) is increased (e.g., CNT(0)=CNT(0)+1) when the candidate bit budget BIT_THR(0) is selected as a target bit budget; the count value CNT(1) is increased (e.g., CNT(1)=CNT(1)+1) when the candidate bit budget BIT_THR(1) is selected as a target bit budget; and so on. When one of the candidate bit budgets BIT_THR(N+1)–BIT_THR(M−1) is selected as the target bit budget $BB_N$, one or more counter values within count values CNT(0)–CNT(N−1) may be updated to reflect the number of remaining bits consumed by the target bit budget $BB_N$ set by a larger candidate bit budget. The same objective of referring to the count value(s) to control the bit budget selection is achieved. This also falls within the scope of the present invention.

As shown in FIG. 6, the header of encoded pixel data of one coding unit may have bit budget information (e.g., a bit budget index of the selected candidate bit budget) included therein to directly inform the image decoding apparatus 104 of the target bit budget allocated to the coding unit by the image encoding apparatus 102. However, the bit budget information stored in headers of all coding units within the access unit would increase the size of the bit-stream BS inevitably.

In a preferred embodiment, the bit budget information (e.g., a bit budget index of the selected candidate bit budget) of one coding unit is stored in a header associated with encoded pixel data of the coding unit only when a certain bit budget information recording condition is met. For example, the bit budget information recording condition is met when the quantization step used for generating the encoded pixel data of the coding unit does not exceed a predetermined threshold (e.g., Q_TH(0)); or the quantization step used for generating the encoded pixel data of the coding unit reaches a predetermined threshold (e.g., Q_TH(3)) and the count value CNT is a non-zero value (if the 1$^{st}$ exemplary design shown in FIG. 11 is employed). In a case where the predetermined threshold Q_TH(0) mentioned above is equal to zero, the bit budget information (e.g., a bit budget index of the selected candidate bit budget) of one coding unit with QP=0 (or QP≥Q_TH(1) & CNT≠0) (e.g., coding units N and N+2 shown in FIG. 7) is stored in the header, and no bit budget information of one coding unit with QP≠0 (or 0<QP<Q_TH(1)) (e.g., coding units N+1 and N+3 shown in FIG. 7) is stored in the header of the coding unit. Though the bit budget information is not directly available in the header, the image decoding apparatus 104 may refer to the same rate control rules used by the image encoding apparatus 102 to correctly identify the bit budget allocated to the coding unit to be decoded. Further details directed to identifying the bit budget allocated to a coding unit to be decoded are described as below.

Please refer to FIG. 1 again. The image decoding apparatus 104 includes a decoder 122 and a bit budget identification circuit 124. The decoder 122 is arranged for receiving and decoding the bit-stream BS composed of encoded pixel data of the access unit in a frame (e.g., a raw image $IMG_{RAW}$). As mentioned above, one access unit includes a plurality of coding units, and each coding unit includes a plurality of pixels. The bit budget identification circuit 124 is coupled to the decoder 122, and arranged for defining a plurality of candidate bit budgets corresponding to different pre-defined maximum encoded bit lengths for one coding unit respectively. Specifically, the candidate bit budgets defined in the bit budget identification circuit 124 at the decoder side should be the same as the candidate bit budgets defined in the rate controller 114 at the encoder side. Hence, candidate bit budgets BB_1-BB_K will also be defined in the bit budget identification circuit 124. The bit budget identification circuit 124 is further arranged for obtaining bit budget information of a current coding unit $CU_N$ based on information derived from decoding the bit-stream BS, and accordingly determining a target bit budget $BB_N$ allocated to the current coding unit $CU_N$ from the candidate bit budgets BB_1-BB_K. Therefore, the decoder 122 is capable of determining a bit start position of a next coding unit $CU_{N+1}$ according to the determined target bit budget $BB_N$ allocated to the current coding unit $CU_N$, and performing parallel decoding upon encoded pixel data of the current coding unit $CU_N$ and encoded pixel data of the next coding unit $CU_{N+1}$.

In one exemplary embodiment, headers in the bit-stream BS include bit budget index values required for determining allocated bit budgets used to find bit start positions of coding units to achieve parallel decoding. Thus, concerning any coding unit whose allocated bit budget needed to be known for finding a bit start position of a next coding unit to be decoded, the bit budget identification circuit 124 always gets the bit budget allocated to the coding unit to be decoded by referring to a bit budget index value stored in a header associated with encoded pixel data of the coding unit.

In another exemplary embodiment, the bit budget index value is included in the header only when the encoded pixel data of the pixels within the current coding unit is generated based on one quantization step which does not exceed a predetermined threshold (e.g., QP≤Q_TH(0)), or generated based one quantization step which is not smaller than a predetermined threshold (e.g., QP≥Q_TH(1)) and the count value CNT is a non-zero value (if the 1$^{st}$ exemplary design shown in FIG. 11 is employed). Thus, concerning one coding unit whose allocated bit budget needed to be known for finding a bit start position of a next coding unit to be decoded, the bit budget identification circuit 124 directly gets a bit budget index value of the coding unit from the header if the encoded pixel data of the current coding unit is generated based on one quantization step not exceeding the predetermined threshold Q_TH(0); or generated based one quantization step which is not smaller than a predetermined threshold Q_TH(1) and a count value CNT is a non-zero value (if the 1$^{st}$ exemplary design shown in FIG. 11 is employed); and the bit budget identification circuit 124 cannot directly get the budget index value of the coding unit from the header if the encoded pixel data of the current coding unit is generated based on one quantization step exceeding the predetermined threshold (e.g., TH_Q(0)<QP); or generated based on one quantization step between two predetermined thresholds (e.g., TH_Q(0) <QP<TH_Q(1)), if the 1$^{st}$ exemplary design shown in FIG. 11 is employed. When no bit budget index value of the coding unit is directly available in the header, the bit budget identification circuit 124 may be configured to follow the same rate control rules employed by the rate controller 114 to identify the target bit budget. Further details are described as below.

Like the rate controller 114, the bit budget identification circuit 124 determines the target bit budget $BB_N$ of the current coding unit $CU_N$ to be decoded by checking at least one of the following parameters: a quantization parameter which indicates a quantization step used for encoding the current coding unit, one bit budget allocated to at least one previous coding unit within the same access unit where the current coding unit $CU_N$ is located, and a position of the current coding unit $CU_N$ within the access unit.

For clarity and simplicity, the following assumes that the bit budget identification circuit 124 employs candidate bit budgets BB 1, BB_2, BB_3 set by BIT_THR(0), BIT_THR (1), BIT_THR(2) respectively. Therefore, the operation of the bit budget identification circuit 124 is illustrated with reference to FIG. 9. The quantization parameter is an existing syntax element in the header associated with encoded pixel data of pixels within the current coding unit $CU_N$ to be decoded. Thus, during the decoding of the bit-stream BS, the quantization step used for generating the encoded pixel data of the current coding unit $CU_N$ can be easily known by parsing the header. After getting information of the quantization step, the bit budget identification circuit 124 decides the quantization step range in which the quantization step is located. When the quantization step exceeds the predetermined threshold Q_TH(0) and is smaller than the predetermined threshold Q_TH(1), the bit budget identification circuit 124 selects an expected average bit budget (i.e., the candidate bit budget BIT_THR(1)) as the target bit budget $BB_N$ for the current coding unit $CU_N$ to be decoded.

When the quantization step reaches the predetermined threshold Q_TH(1), the bit budget identification circuit 124 first checks remaining bit information indicative of accumulated remaining bits resulting from bit budget allocation of previous coding unit(s) in the access unit. Like the rate controller 114, the bit budget identification circuit 124 includes a budget counter used to maintain a count value CNT to record remaining bit information indicative of accumulated remaining bits. Similarly, the count value CNT is updated each time one of the candidate bit budgets BIT_THR(0) and BIT_THR (2) is selected as a target bit budget. Specifically, the bit budget identification circuit 124 resets the budget counter before the decoding of the access unit starts. The count value CNT is increased (e.g., CNT=CNT+1) when the candidate bit budget BIT_THR(0) is selected as a target bit budget, and is decreased (e.g., CNT=CNT-1) when the candidate bit budget BIT_THR(2) is selected as a target bit budget. As can be known from FIG. 9 and FIG. 11, the bit budget identification circuit 124 selects the candidate bit budget BIT_THR(1) as the target bit budget $BB_N$ for the current coding unit $CU_N$ to be decoded when the count value CNT is equal to zero, and determines the target bit budget $BB_N$ for the current coding unit $CU_N$ to be decoded by obtaining the bit budget index in the header when the count value CNT is not equal to zero. For example, $BB_N$=BIT_THR(1) if the bit budget index=1; and $BB_N$=BIT_THR(2) if the bit budget index=2.

Alternatively, as can be known from FIG. 9 and FIG. 12, the bit budget identification circuit 124 directly selects the candidate bit budget BIT_THR(1) as the target bit budget $BB_N$ for the current coding unit $CU_N$ to be decoded when the count value CNT is equal to zero, and directly selects the candidate bit budget BIT_THR(2) as the target bit budget $BB_N$ for the current coding unit $CU_N$ to be decoded when the count value CNT is not equal to zero. To put it simply, when the quantization step reaches the predetermined threshold Q_TH(1), the candidate bit budget BIT_THR(2) is not used as the target bit budget if there is no accumulated remaining bit currently.

If the balance between the number of times the candidate bit budget BIT_THR(0) is selected as a target bit budget and the number of times the candidate bit budget BIT_THR(2) is selected as a target bit budget is considered by the rate controller 114, the bit budget information circuit 124 would follow the same rate control rule to determine the target bit budget $BB_N$ for the current coding unit $CU_N$ to be decoded.

For example, when finding that N1=N2-N3, the bit budget identification circuit 124 directly uses a largest candidate bit budget (e.g., BIT_THR(2)) among the candidate bit budgets as the target bit budget $BB_N$ for the current coding unit $CU_N$ to be decoded, where N1 is the number of accumulated remaining bits resulting from bit budget allocation of previous coding unit(s) within the access unit, N3 is a product of the number of coding unit(s) in the access unit AU that are not decoded yet and an expected average bit budget (e.g., BIT_THR(1)), and N2 is a product of the number of the coding unit(s) not decoded yet and the largest candidate bit budget (e.g., BIT_THR(2)). In a preferred embodiment, BIT_THR(0)=BIT_THR(1)-BIT_offset, BIT_THR(2)=BIT_THR(1)+BIT_offset, and the count value CNT is used to record the remaining bit information. Hence, when the number $N_{CU\_D}$ of coding units in the access unit AU that are not decoded yet is equal to the count value CNT (i.e., $N_{CU\_D}$=CNT), the candidate bit budget BIT_THR(2) is directly used as the target bit budget for each of the coding units not decoded yet.

For another example, when finding that N1=N2'-N3' under QP≤Q_TH(0), the bit budget identification circuit 124 directly selects a specific candidate bit budget (e.g., BIT_THR(1)) equal to the expected average bit budget as the target bit budget $BB_N$ for the current coding unit $CU_N$, where N1 is the number of accumulated remaining bits resulting from bit budget allocation of previous coding unit(s) within the access unit, N2' is equal to a product of ($N_{CU\_D}$-1) and a largest candidate bit budget (e.g., BIT_THR(2)) among the candidate bit budgets, and N3 is equal to a product of ($N_{CU\_D}$-1) and the expected average bit budget (e.g., BIT_THR(1)), and $N_{CU\_D}$ is the number of coding unit(s) within the access unit that are not decoded yet. In a preferred embodiment, BIT_THR(0)=BIT_THR(1)-BIT_offset, BIT_THR(2)=BIT_THR(1)+BIT_offset, and the count value CNT is used to record the remaining bit information. Hence, when the number $N_{CU\_D}$ of coding units in the access unit that are not decoded yet is equal to the count value CNT plus one (i.e., $N_{CU\_D}$=CNT+1) under the condition where the quantization step does not exceed the predetermined threshold Q_TH(0), the candidate bit budget BIT_THR(1) is directly used as the target bit budget for the current coding unit $CU_N$; otherwise, the bit budget index in the header is obtained for deciding the target bit budget $BB_N$. For example, $BB_N$=BIT_THR(0) if bit budget index=0; and $BB_N$=BIT_THR(1) if bit budget index=1. It should be noted that, when the candidate bit budget BIT_THR(1) is directly used as the target bit budget for the current coding unit $CU_N$, each of the next coding units will be assigned with the target bit budget set by candidate bit budget BIT_THR(2) due to $N_{CU\_D}$=CNT.

Figure 14:
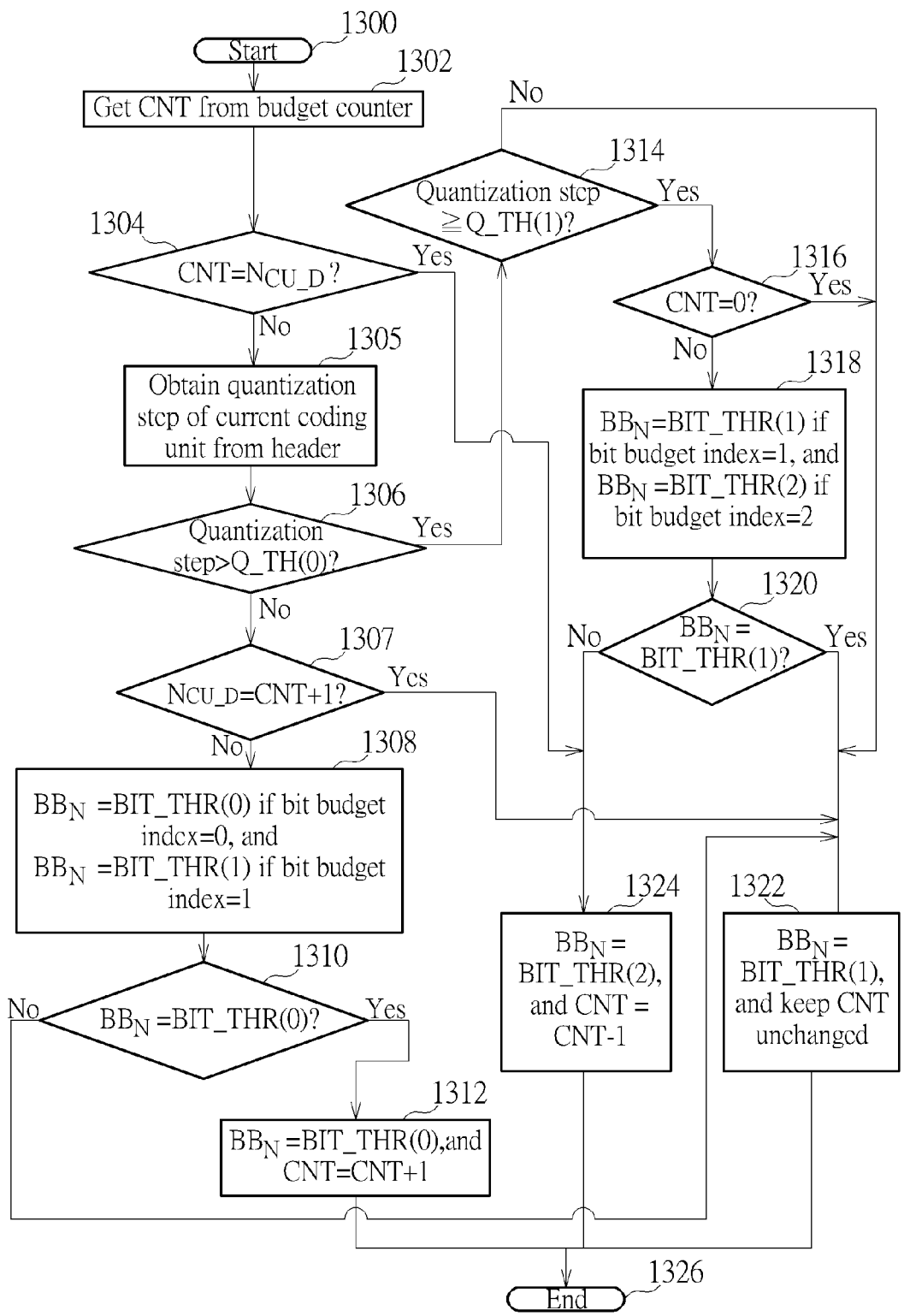
FIG. 14 is a flowchart illustrating an image decoding method according to an embodiment of the present invention.

FIG. 14 is a flowchart illustrating an image decoding method according to an embodiment of the present invention. Provided that the result is substantially the same, the steps are not required to be executed in the exact order shown in FIG. 14. Besides, additional steps may be inserted, and/or existing steps may be omitted. Suppose that three candidate bit budgets BIT_THR(0), BIT_THR(1), BIT_THR(2) are used, where $$\text{BIT\_THR}(1) = \frac{BB_{AU}}{M},$$

BIT_THR(0) BIT_THR(1)−BIT_offset, and BIT_THR (2)=BIT_THR(1)+BIT_offset; and the budget counter is used to generate a count value CNT indicative of accumulated remaining bits resulting from bit budget allocation of previous coding unit(s) in an access unit AU. Specifically, the image decoding method shown in FIG. 14 corresponds to the image encoding method shown in FIG. 10 and FIG. 11. The method of identifying a target bit budget $BB_N$ for a current coding unit $CU_N$ of the access unit may be performed by the image decoding apparatus 104 and may be briefly summarized as below.

Step 1300: Start.

Step 1302: Read a count value CNT from a budget counter, wherein the count value CNT is reset to an initial value (e.g., 0) before decoding of an access unit AU starts.

Step 1304: Check if the count value CNT is equal to the number $N_{CU\_D}$ of coding unit(s) within the access unit AU that are not decoded yet (i.e., CNT=$N_{CU\_D}$?). If yes, go to step 1324; otherwise, go to step 1305. Generally, step 1304 is to check if N1=N2−N3, where N1 is the number of accumulated remaining bits resulting from bit budget allocation of previous coding unit(s) within the access unit AU, N3 is a product of the number of coding unit(s) in the access unit AU that are not decoded yet and an expected average bit budget (e.g., BIT_THR(1)), and N2 is a product of the number of the coding unit(s) not decoded yet and the largest candidate bit budget BIT_THR(2).

Step 1305: Obtain a quantization step indicated by a quantization parameter stored in the header associated with encoded pixel data of pixels within the current coding unit $CU_N$ to be decoded.

Step 1306: Check if the quantization step exceeds the predetermined threshold Q_TH(0). If yes, go to step 1314; otherwise, go to step 1307.

Step 1307: Check if the number $N_{CU\_D}$ of coding unit(s) within the access unit AU that are not decoded yet is equal to the count value CNT plus one (i.e., $N_{CU\_D}$=CNT+1?). If yes, go to step 1322; otherwise, go to step 1308. Generally, step 1307 is to check if N1=N2'−N3', where N2' is equal to a product of ($N_{CU\_D}$−1) and the largest candidate bit budget BIT_THR(2), and N3' is equal to a product of ($N_{CU\_D}$−1) and the expected average bit budget (e.g., BIT_THR(1)).

Step 1308: Refer to the bit budget index value in the header to select one of the candidate bit budgets BIT_THR(0) and BIT_THR(1) as the target bit budget $BB_N$.

Step 1310: Is the candidate bit budget BIT_THR(0) selected as the target bit budget $BB_N$? If yes, go to step 1312; otherwise, go to step 1322.

Step 1312: Use the candidate bit budget BIT_THR(0) as the target bit budget $BB_N$, and update the count value CNT (e.g., CNT=CNT+1). Go to step 1326.

Step 1314: Check if the quantization step reaches the predetermined threshold Q_TH(1). If yes, go to step 1316; otherwise, go to step 1322.

Step 1316: Check if the count value CNT is equal to zero. If yes, go to step 1322; otherwise, go to step 1318.

Step 1318: Refer to the bit budget index value in the header to select one of the candidate bit budgets BIT_THR(1) and BIT_THR(2) as the target bit budget $BB_N$.

Step 1320: Is the candidate bit budget BIT_THR(1) selected as the target bit budget $BB_N$? If yes, go to step 1322; otherwise, go to step 1324. Step 1322: Use the candidate bit budget BIT_THR(1) as the target bit budget $BB_N$, and keep the count value CNT unchanged. Go to step 1326.

Step 1324: Use the candidate bit budget BIT_THR(2) as the target bit budget $BB_N$, and update the count value CNT (e.g., CNT=CNT−1).

Step 1326: End.

As a person skilled in the pertinent art can readily understand details of each step shown in FIG. 14 after reading above paragraphs, further description is omitted here for brevity.

Figure 15:
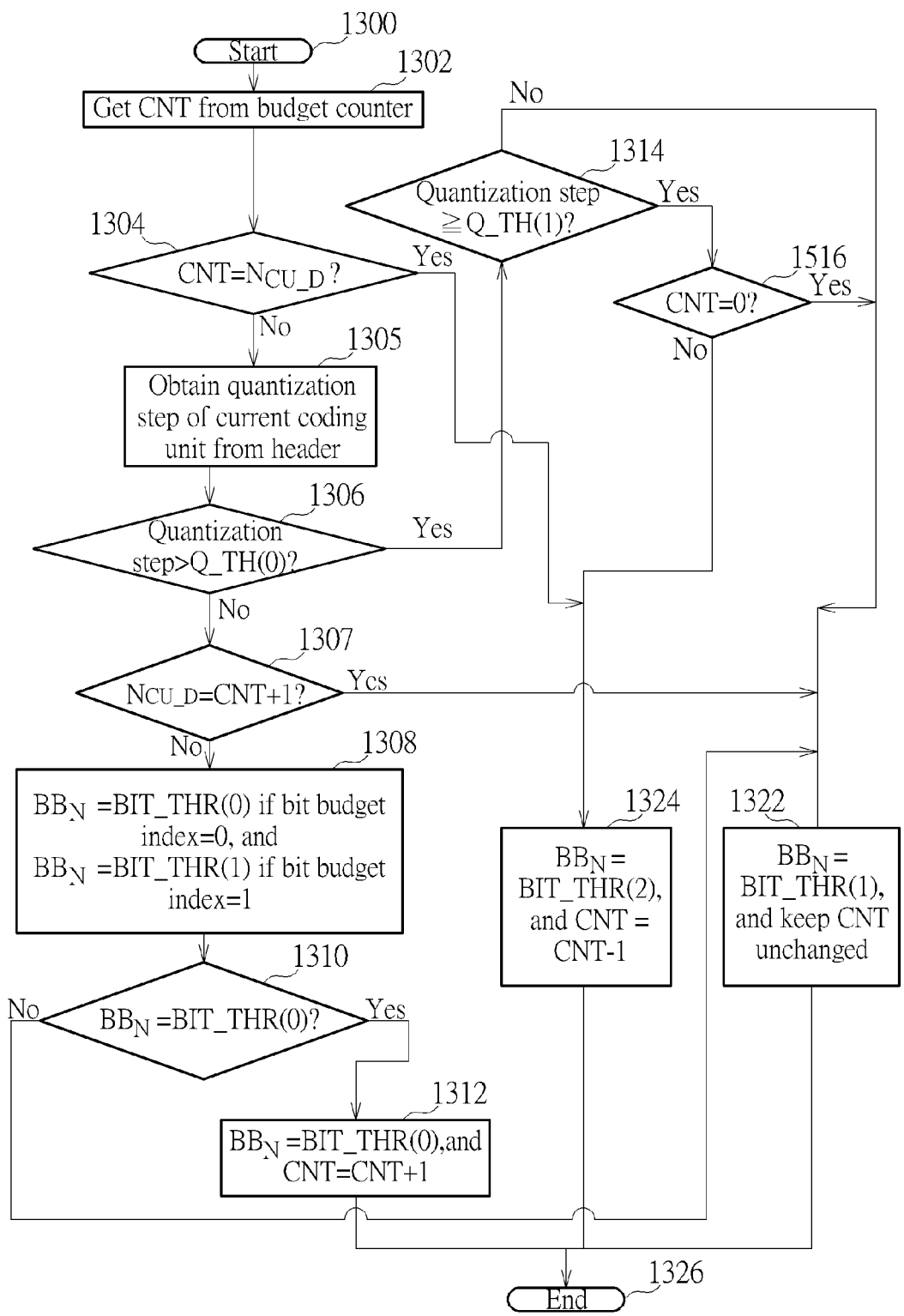
FIG. 15 is a flowchart illustrating an image decoding method according to another embodiment of the present invention.

FIG. 15 is a flowchart illustrating another image decoding method according to an embodiment of the present invention. Provided that the result is substantially the same, the steps are not required to be executed in the exact order shown in FIG. 15. Besides, additional steps may be inserted, and/or existing steps may be omitted. Specifically, the image decoding method shown in FIG. 15 corresponds to the image encoding method shown in FIG. 10 and FIG. 12. The major difference between the flows shown in FIG. 14 and FIG. 15 is that steps 1318 and 1320 are omitted in FIG. 15, and step 1516 is modified in FIG. 15 such that the flow proceeds with step 1324 when CNT≠0. As a person skilled in the pertinent art can readily understand details of each step shown in FIG. 15 after reading above paragraphs, further description is omitted here for brevity.

As mentioned above, the rate control mechanism is not limited to a rate controller design using three candidate bit budgets BIT_THR(0)−BIT_THR(2). For example, the rate controller 114 may be configured to use five candidate bit budgets BIT_THR(0)−BIT_THR(4), and follows the rate control rules illustrated in FIG. 12 to determine the target bit budget $BB_N$ for the current coding unit $CU_N$. Similarly, the bit budget identification circuit 124 at the decoder side may be configured to follow the same rate control rules employed by the rate controller 114 at the encoder side to identify the target bit budget $BB_N$ for the current coding unit $CU_N$. Further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image encoding method with rate control, comprising:
   defining a plurality of candidate bit budgets corresponding to different pre-defined maximum encoded bit lengths for one coding unit respectively;
   when encoding pixel data of a plurality of pixels within a current coding unit of an access unit of a frame, determining a target bit budget selected from the candidate bit budgets and allocating the target bit budget to the current coding unit; and
   outputting encoded pixel data of the pixels within the current coding unit, wherein a bit length of the encoded pixel data is smaller than or equal to the target bit budget.

2. The image encoding method of claim 1, further comprising:
   when the bit length of the encoded pixel data is smaller than the target bit budget, appending dummy bits to the encoded pixel data, wherein a bit length of the added dummy bits is equal to a difference between the bit length of the encoded pixel data and the target bit budget.

3. The image encoding method of claim 1, wherein the step of determining the target bit budget selected from the candidate bit budgets comprises:

selecting the target bit budget from the candidate bit budgets according to at least a current quantization step used for encoding the current coding unit.

4. The image encoding method of claim 1, wherein the step of determining the target bit budget selected from the candidate bit budgets comprises:
selecting the target bit budget from the candidate bit budgets according to at least one bit budget allocated to at least one previous coding unit within the access unit.

5. The image encoding method of claim 1, wherein the step of determining the target bit budget selected from the candidate bit budgets comprises:
selecting the target bit budget from the candidate bit budgets according to at least a position of the current coding unit within the access unit.

6. The image encoding method of claim 1, wherein the step of determining the target bit budget selected from the candidate bit budgets comprises:
comparing an encoded bit length of the current coding unit under a current quantization step with a first candidate bit budget; and
when the encoded bit length of the current coding unit under the current quantization step does not exceed the first candidate bit budget and the current quantization step does not exceed a predetermined threshold, using the first candidate bit budget as the target bit budget.

7. The image encoding method of claim 6, wherein the first candidate bit budget is smaller than an expected average bit budget for coding units within the access unit.

8. The image encoding method of claim 6, wherein the first candidate bit budget is equal to an expected average bit budget for coding units within the access unit.

9. The image encoding method of claim 6, wherein the step of comparing the encoded bit length of the current coding unit under the current quantization step with the first candidate bit budget is performed under a condition that it is determined that the encoded bit length of the current coding unit under the current quantization step exceeds a second candidate bit budget smaller than the first candidate bit budget.

10. The image encoding method of claim 9, wherein the first candidate bit budget is equal to an expected average bit budget for coding units within the access unit.

11. The image encoding method of claim 1, wherein the step of determining the target bit budget selected from the candidate bit budgets comprises:
when a current quantization step is not smaller than a predetermined threshold, deciding whether a first candidate bit budget or a second candidate bit budget is used as the target bit budget by at least referring to remaining bit information indicative of accumulated remaining bits resulting from bit budget allocation of previous coding unit(s) in the access unit, wherein the second candidate bit budget is larger than the first candidate bit budget.

12. The image encoding method of claim 11, wherein the step of deciding whether the first candidate bit budget or the second candidate bit budget is used as the target bit budget comprises:
checking if the second candidate bit budget is used as the target bit budget under a current quantization step under a condition that it is determined that the first candidate bit budget is not used as the target bit budget under the current quantization step.

13. The image encoding method of claim 11, wherein the first candidate bit budget is used as the target bit budget when there is no accumulated remaining bit currently; and the second candidate bit budget is used as the target bit budget when there are accumulated remaining bits currently.

14. The image encoding method of claim 11, wherein the first candidate bit budget is equal to an expected average bit budget for coding units within the access unit.

15. The image encoding method of claim 11, wherein the candidate bit budgets include at least one second candidate bit budget each being larger than the first candidate bit budget and at least one third candidate bit budget each being smaller than the first candidate bit budget; and the step of determining the target bit budget selected from the candidate bit budgets further comprises:
resetting at least one budget counter before the rate control starts, wherein the remaining bit information is recorded by the at least one budget counter; and
updating at least one count value stored by the at least one budget counter when one of the at least one second candidate bit budget and the at least one third candidate bit budget is used as a target bit budget for one coding unit.

16. The image encoding method of claim 1, wherein the step of determining the target bit budget selected from the candidate bit budgets comprises:
when N1=N2−N3, directly using a largest candidate bit budget among the candidate bit budgets as the target bit budget, where N1 is a number of accumulated remaining bits resulting from bit budget allocation of previous coding unit(s) within the access unit, N3 is a product of an expected average bit budget and a number of coding unit(s) in the access unit that are not encoded yet, and N2 is a product of the number of the coding unit(s) not encoded yet and the largest candidate bit budget.

17. The image encoding method of claim 1, wherein the step of determining the target bit budget selected from the candidate bit budgets comprises:
when a criterion of setting the target bit budget by a first candidate bit budget is met, checking if N1=N2'−N3'; and
when N1=N2'−N3', selecting a second candidate bit budget that is equal to or larger than an expected average bit budget for coding units within the access unit as the target bit budget, where N1 is a number of accumulated remaining bits resulting from bit budget allocation of previous coding unit(s) within the access unit, N2' is equal to a product of ($N_{CU\_E}-1$) and a largest candidate bit budget among the candidate bit budgets, N3' is equal to a product of ($N_{CU\_E}-1$) and the expected average bit budget, and $N_{CU\_E}$ is a number of coding unit(s) within the access unit that are not encoded yet.

18. The image encoding method of claim 1, further comprising:
embedding bit budget information associated with the target bit budget allocated to the current coding unit into a bit-stream composed of encoded pixel data of the access unit.

19. The image encoding method of claim 18, wherein the bit budget information is a bit budget index value stored in a header associated with the encoded pixel data of the pixels within the current coding unit.

20. The image encoding method of claim 19, wherein the bit budget index value is stored in the header when the encoded pixel data of the pixels within the current coding unit is generated at least based on one quantization step which does not exceed a first predetermined threshold; or the bit budget index value is stored in the header when the encoded pixel data of the pixels within the current coding unit is generated based on one quantization step which reaches a second predetermined threshold and there are accumulated remaining bits resulting from bit budget allocation of previous coding unit(s) in the access unit.

21. An image decoding method, comprising:
defining a plurality of candidate bit budgets corresponding to different pre-defined maximum encoded bit lengths for one coding unit respectively;
receiving and decoding a bit-stream composed of encoded pixel data of an access unit in a frame, wherein the access unit includes a plurality of coding units; and
obtaining bit budget information of a current coding unit to be decoded based on information derived from decoding the bit-stream for determining a target bit budget allocated to the current coding unit from the candidate bit budgets.

22. The image decoding method of claim 21, further comprising:
performing parallel decoding upon encoded pixel data of the current coding unit and encoded pixel data of a next coding unit according to the determined target bit budget allocated to the current coding unit.

23. The image decoding method of claim 21, wherein the step of determining the target bit budget allocated to the current coding unit comprises:
when a bit budget index value for the current coding unit is included in a header associated with encoded pixel data of pixels within the coding unit, selecting the target bit budget from the candidate bit budgets according to the bit budget index value.

24. The image decoding method of claim 23, further comprising:
obtaining the bit budget index value from the header when at least a quantization step used for generating encoded pixel data of pixels within the current coding unit does not exceed a first predetermined threshold; or
obtaining the bit budget index value from the header when the quantization step reaches a second predetermined threshold larger than the first predetermined threshold and there are accumulated remaining bits resulting from bit budget allocation of previous coding unit(s) within the access unit.

25. The image decoding method of claim 21, wherein the step of determining the target bit budget allocated to the current coding unit comprises:
selecting the target bit budget from the candidate bit budgets according to at least a quantization step used for encoding the current coding unit.

26. The image decoding method of claim 21, wherein the step of determining the target bit budget allocated to the current coding unit comprises:
selecting the target bit budget from the candidate bit budgets according to at least one bit budget allocated to at least one previous coding unit within the access unit.

27. The image decoding method of claim 21, wherein the step of determining the target bit budget allocated to the current coding unit comprises:
selecting the target bit budget from the candidate bit budgets according to at least a position of the current coding unit within the access unit.

28. The image decoding method of claim 21, wherein the step of determining the target bit budget allocated to the current coding unit comprises:
obtaining a quantization step from a header; and
when the quantization step exceeds a first predetermined threshold and does not reach a second predetermined threshold, selecting a specific candidate bit budget as the target bit budget, wherein the specific candidate bit budget is equal to an expected average bit budget for coding units within the access unit.

29. The image decoding method of claim 21, wherein the step of determining the target bit budget allocated to the current coding unit comprises:
obtaining a quantization step from a header; and
when the quantization step is not smaller than a predetermined threshold, deciding whether a first candidate bit budget or a second candidate bit budget is selected as the target bit budget by at least referring to remaining bit information indicative of accumulated remaining bits resulting from bit budget allocation of previous coding unit(s) within the access unit, wherein the first bit budget is equal to an expected average bit budget for coding units within the access unit, and the second candidate bit budget is larger than the first candidate bit budget.

30. The image decoding method of claim 29, wherein the first candidate bit budget is used as the target bit budget when there is no accumulated remaining bit currently; and the second candidate bit budget is used as the target bit budget when there are accumulated remaining bits currently.

31. The image decoding method of claim 29, wherein the candidate bit budgets include at least one second candidate bit budget each being larger than the first candidate bit budget and at least one third candidate bit budget each being smaller than the first candidate bit budget; and the step of determining the target bit budget allocated to the current coding unit further comprises:
resetting at least one budget counter before decoding of the access unit starts, wherein the remaining bit information is recorded by the at least one budget counter; and
updating at least one count value stored by the at least one budget counter when one of the at least one second candidate bit budget and the at least one third candidate bit budget is used as a target bit budget for one coding unit.

32. The image decoding method of claim 21, wherein the step of determining the target bit budget allocated to the current coding unit comprises:
when N1=N2−N3, directly using a largest candidate bit budget among the candidate bit budgets as the target bit budget, where N1 is a number of accumulated remaining bits resulting from bit budget allocation of previous coding unit(s) within the access unit, N3 is a product of an expected average bit budget and a number of coding unit(s) in the access unit that are not decoded yet, and N2 is a product of the number of coding unit(s) not decoded yet and the largest candidate bit budget.

33. The image decoding method of claim 21, wherein the step of determining the target bit budget allocated to the current coding unit comprises:
when a quantization step used for encoding the current coding unit does not exceed a predetermined threshold, checking if N1=N2'−N3'; and
when N1=N2'−N3', selecting a second candidate bit budget that is equal to or larger than an expected average bit budget for coding units within the access unit as the target bit budget, where N1 is a number of accumulated remaining bits resulting from bit budget allocation of previous coding unit(s) within the access unit, N2' is equal to a product of ($N_{CU\_D}$−1) and a largest candidate bit budget among the candidate bit budgets, N3' is equal to a product of ($N_{CU\_D}$−1) and the expected average bit budget, and $N_{CU\_D}$ is a number of coding unit(s) within the access unit that are not decoded yet.

34. An image encoding apparatus, comprising:
- an encoder, arranged for encoding pixel data of a plurality of pixels within a current coding unit of an access unit of a frame, and outputting encoded pixel data of the pixels within the current coding unit; and
- a rate controller, arranged for defining a plurality of candidate bit budgets corresponding to different pre-defined maximum encoded bit lengths for one coding unit respectively; and determining a target bit budget selected from the candidate bit budgets and allocating the target bit budget to the current coding unit when the encoder is encoding the current coding unit, wherein a bit length of the encoded pixel data output from the encoder is smaller than or equal to the target bit budget.

35. An image decoding apparatus, comprising:
- a decoder, arranged for receiving and decoding a bit-stream composed of encoded pixel data of an access unit in a frame, wherein the access unit includes a plurality of coding units; and
- a bit budget identification circuit, arranged for defining a plurality of candidate bit budgets corresponding to different pre-defined maximum encoded bit lengths for one coding unit respectively; and obtaining bit budget information of a current coding unit based on information derived from decoding the bit-stream for determining a target bit budget allocated to the current coding unit from the candidate bit budgets.

* * * * *